(12) United States Patent
Johnson et al.

(10) Patent No.: US 9,178,340 B2
(45) Date of Patent: Nov. 3, 2015

(54) CONDUCTOR STRINGING APPARATUS AND PROCESS

(75) Inventors: Dutch Johnson, Haughton, LA (US); John J. Martin, Castor, LA (US)

(73) Assignee: TSE International, Inc., Shreveport, LA (US)

(*) Notice: Subject to any disclaimer, the term of this patent is extended or adjusted under 35 U.S.C. 154(b) by 837 days.

(21) Appl. No.: 13/415,171

(22) Filed: Mar. 8, 2012

(65) Prior Publication Data

US 2012/0168700 A1 Jul. 5, 2012

Related U.S. Application Data

(62) Division of application No. 12/109,191, filed on Apr. 24, 2008, now Pat. No. 8,322,689.

(51) Int. Cl.
*H02G 1/02* (2006.01)

(52) U.S. Cl.
CPC ........................................ *H02G 1/02* (2013.01)

(58) Field of Classification Search
USPC .................. 254/134.3 PA, 134.3 R, 134.3 FT
See application file for complete search history.

(56) References Cited

U.S. PATENT DOCUMENTS

| | | | |
|---|---|---|---|
| 3,073,574 A * | 1/1963 | Garnett | 254/214 |
| 3,141,630 A | 7/1964 | Eitel | |
| 3,226,087 A * | 12/1965 | Eitel | 254/134.3 R |
| 3,271,009 A | 9/1966 | Wright | |
| 3,319,935 A | 5/1967 | Eitel | |
| 3,326,528 A | 6/1967 | McIntyre | |
| 4,183,649 A | 1/1980 | Hartley | |
| 4,596,349 A | 1/1986 | Saracini | |
| 5,178,368 A | 1/1993 | Saracini | |
| 5,221,074 A * | 6/1993 | Saracini | 254/134.3 PA |
| 5,826,859 A | 10/1998 | Kononov et al. | |
| 2007/0158093 A1 | 7/2007 | Barthold | |

* cited by examiner

*Primary Examiner* — Lee D Wilson
*Assistant Examiner* — Shantese McDonald
(74) *Attorney, Agent, or Firm* — Woodling, Krost and Rust

(57) ABSTRACT

A line stringing apparatus includes in combination an electric motor, motor controller and a processor switchable between a pulling mode and a tensioning mode. An electric motor expends electrical energy when pulling the line and generates electrical energy when tensioning the line. The processor outputting commands to the motor controller for control thereof and for application of electrical energy from the batteries to the electric motor when in the pulling mode and for application of electrical energy generated by the electric motor to the plurality of batteries when in tensioning mode. The processor limits electric motor torque and speed based on operator commands for speed and torque in said pulling mode; and, the processor controlling electric motor torque in the tensioning mode.

13 Claims, 16 Drawing Sheets

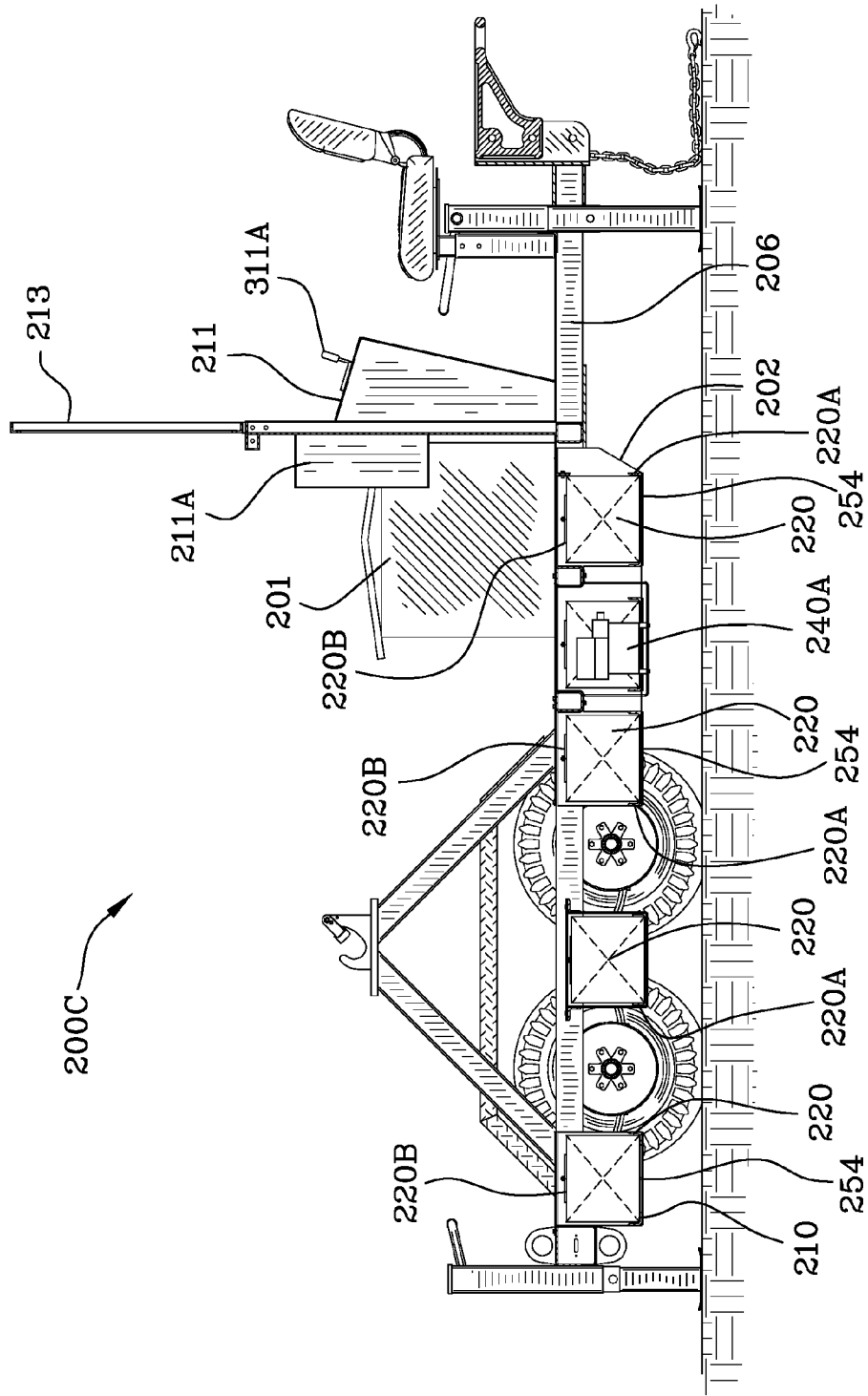

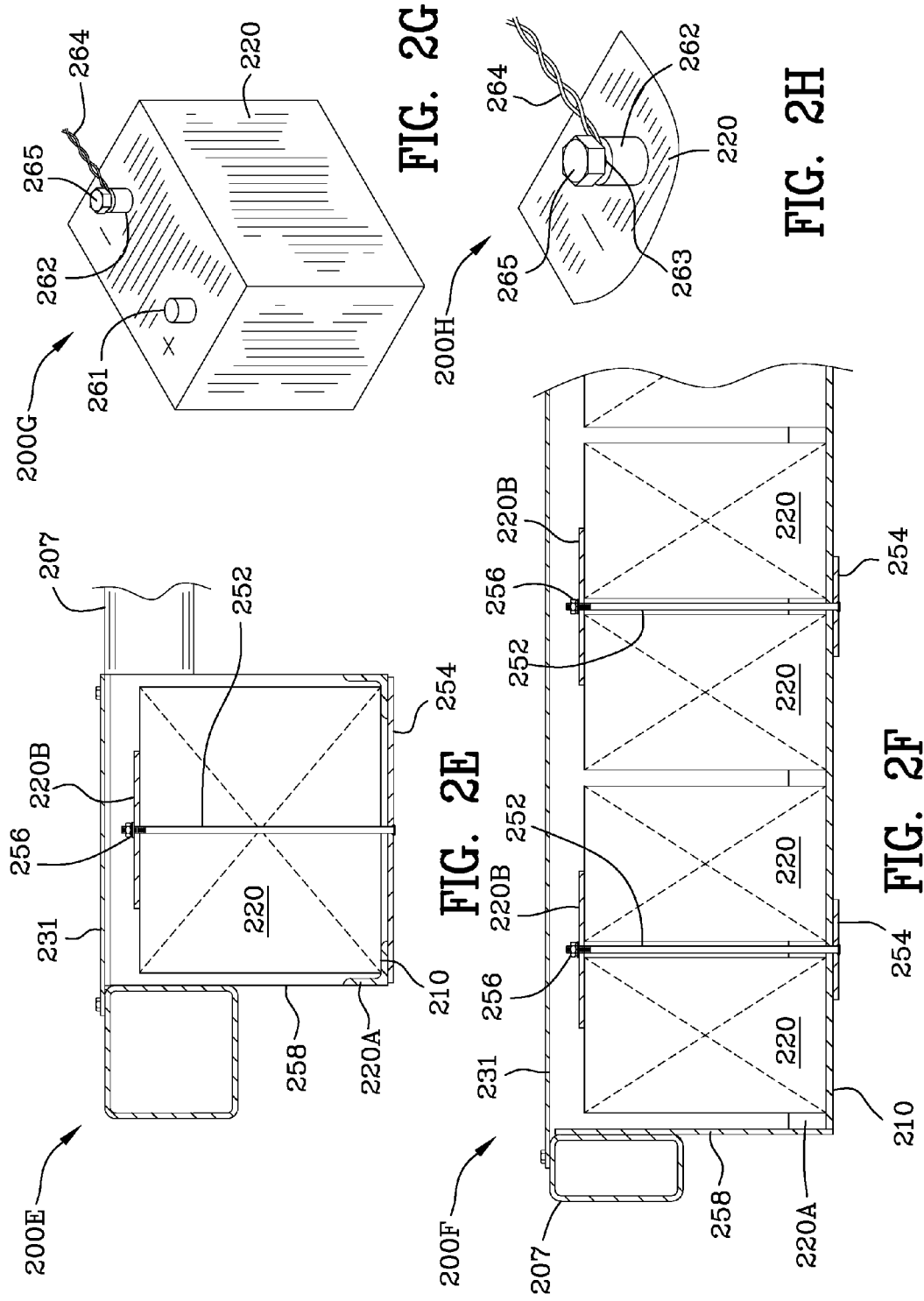

CONDUCTOR STRINGING APPARATUS AND PROCESS

This patent application is a division of application Ser. No. 12/109,191 filed Apr. 24, 2008, now U.S. Pat. No. 8,322,689 and this patent application claims the benefit of, and the priority to said application Ser. No. 12/109,191 filed Apr. 24, 2008.

FIELD OF THE INVENTION

The invention is in the field of conductor stringing apparatuses and processes.

BACKGROUND OF THE INVENTION

High voltage utility transmission lines are capable of supplying power over tens or hundreds of miles (or further) with minimal losses because of the very high voltages used. Step-up transformers located at utility power generation plants boost the voltage transmission levels up, depending on the particular utility, to and beyond 745 kV AC. At high voltages, power can be transmitted effectively as power transmission is a function of voltage times the current times the cosine of the phase angle between the voltage and the current. Use of high voltage minimizes current in the lines which thus minimizes losses which can be generally expressed as current squared times the resistance of the transmission line (i.e., the conductor).

Electrical demand in the United States and worldwide has steadily grown. Larger and more conductors are needed. Utilities constantly upgrade their systems at choke points in the grid to add new conductors and/or to replace existing conductors with new conductors which may be able to carry more current. Conductor stringing apparatuses and processes are used between utility towers or poles which may be separated by large distances, for example, they may be a quarter of a mile to a half a mile apart.

In a conductor stringing operation, a device called a conductor or cable puller-tensioner is used. Two machines are necessary. One of the machines functions as a puller which supplies the energy to pull the conductor against the friction of fixtures on the poles, against the force of the cable by virtue of its mass and the earth's gravitational attraction (i.e., its weight) and against the resistance supplied by the other machine which functions as a tensioner. The tensioner is a necessary part of the equipment and process lest the cable/conductor would sag and get tangled up with foliage, trees or other structures located beneath the cable/conductor path.

Previously, a drum puller/tensioner was typically powered by an internal combustion engine driving a hydraulic pump. The resulting pressure and flow in the hydraulic system coupled with a mechanical gear reducer would rotate the drum at the specified torque and speed. Tensioning was hydraulically controlled. As the pulling rope began to rotate the drum, it created pressure in the hydraulic system that could be adjusted to create the desired line tension.

U.S. Pat. No. 3,326,528 to S. S. McIntyre entitled Cable Stringing and Tensioning System discloses at col. 3, lns. 34 et seq. "the operator of the vehicle initially energizes the stator coils with current that may be supplied from a storage battery 50. Eddy currents are then generated by the relative motion of rotors and stator that produce a magnetic field in the rotors. This tends to retard rotation of the rotors and shaft 40, and this retarding force on shaft 40 builds up through the train of gearing . . . and is transferred back therethrough the sheaves . . . to resist their turning for braking the outfeed of transmission cable thereover."

Many high voltage utility transmission lines are located in or near cities. Some of these lines require periodic replacement and/or upgrade and considerable noise and pollution is generated by internal combustion engines which power existing conductor stringing puller-tensioners. The noise and pollution present nuisances for those living in proximity to the high voltage transmission lines. It is, therefore, desirable to have a conductor stringing apparatus which is environmentally compatible and efficient.

SUMMARY OF THE INVENTION

An electric drive system powered by an on-board battery bank to run a drum puller-tensioner used in the utility industry is disclosed and claimed. Further, a multi-drum puller-tensioner or bullwheel tensioner may be used employing the principles expressed herein. The battery bank (renewable energy storage) is to be of sufficient voltage and capacity to allow operation for a minimum of two hours at maximum rated torque and speed. Tensioning is achieved by magnetic coupling of the rotor and stator of the electric motor. Although it is preferred to use an alternating current motor it will be understood by those skilled in the art that a direct current motor may be used. Energy produced during tensioning is stored in the battery bank or converted to heat by a resistor bank and can be maintained indefinitely at the maximum rated tension and line speed. It was determined that an electrical solution could be applied to replace the internal combustion engine and hydraulics that are traditionally used in hydraulic puller-tensioner. The benefits of the instant invention include zero emissions and extreme reduction in noise.

There are three electrical circuits used in the puller-tensioner. First, the main high voltage circuit operates nominally at 180 volts dc and supplies the electric motor after being converted by the motor controller to three phase alternating current power. Twelve (12) and twenty-four (24) volt dc circuits are used for accessory components.

The high voltage power source is comprised of thirty 30 deep cycle 12 volt batteries that are rated at 150 amp-hours each. "Amp-hours" is a measure of electric charge. One Amp-second is equal to one coulomb. One Amp-hour is equivalent to 3600 coulombs of electric charge. Fifteen (15), 12 volt dc batteries are wired in series to form the nominal 180 volt dc circuit. Two of the fifteen, 12 volt battery strings are wired in parallel resulting in a 180 volt power supply with a 300 amp-hour capacity. Trojan T-1275, 12 volt dc, lead acid deep cycle batteries with a 150 amp-hour capacity are the preferred batteries.

When fifteen (15) Trojan T-1275 batteries are wired in series they combine for a total of 180 VDC. When two strings of 15 batteries are connected in parallel they double the capacity to 300 amp hours. At this voltage, the maximum amp draw will be about 115 amps to supply a 20.7 kW load. The maximum current draw will be reached close to the end of a conductor stringing operation.

The batteries store enough energy to operate the unit for two hours and the combined voltage of the batteries is in the range required by the motor/controller. Any energy storage device that does this would be suitable. In other words, it is specifically contemplated that other battery types such as Lithium Ion and/or Nickel Metal Hydride may be used. Energy storage devices such as capacitors may also be used. Price being a factor, deep cycle lead acid batteries are used. Lead acid batteries give the most energy storage per dollar.

The electric motor is a 3-phase AC motor and rated for 34 kW. When pulling, the motor controller converts the 180 volt direct current energy from the batteries into alternating current to drive the motor. When tensioning, the motor controller converts the alternating current energy produced by the motor to direct current energy that is either stored in the batteries or converted to heat by the resistor bank.

The resistor bank is rated for 20 kW and is controlled by pulse width modulation. In the tension mode, electric energy is produced by the motor from higher tension and speed, more energy is allowed to be dissipated by the resistors. This is automatically controlled in the CAN-Bus program by monitoring battery voltage and adjusting the pulse width modulation accordingly which controls relay contacts, a solid state relay containing no moving parts, or and insulated gate bipolar relay containing no moving parts.

Converters are used to create constant twelve (12) and twenty-four (24) volt dc supplies from the high voltage circuit (180 volt dc) for supplying energy at the appropriate voltages to the accessories. The 180 volt system is charged using a custom, on-board, high voltage charger that is specifically designed for the batteries that are being used. There are a couple of companies that manufacture chargers specifically for the Electric Vehicle industry that would be appropriate. Based on price and ease of use, the Zivan NG-5 was chosen. It requires a 30 amp-230 VAC source and can charge a fully discharged battery pack in 10 hours. This charger was pre-programmed by the manufacturer for the specific battery used to ensure the proper charge curve for longer battery life. Other chargers may be adapted for use.

Alternatively, fresh batteries may be brought to the machine on a trailer if longer usage times are desired. If the customer believes they need that option, a small additional trailer with a set of batteries pre-wired may be supplied. Then it is a matter of unplugging the one plug that connects the onboard batteries to the circuit and plugging in the auxiliary batteries.

There are several secondary devices that are needed for full functionality. A custom electric brake is used in conjunction with the electric drive. The electric brake is able to supply a braking torque of 150 ft-lbs or, expressed another way, 1800 in-lbs. When the speed reduction of 67.642 of the sprockets and gearbox are considered the electric brake provides approximately 121,755 inch-lbs of resistive torque. The torque is sufficient to hold the pulling reel at maximum line pull when the machine is manually or automatically shut down. The level wind is powered by a Duff-Norton electro-mechanical cylinder.

Controlling the unit is a Parker IQAN-MD3 Master Module (hereinafter sometimes referred to as the "processor"). A CAN program was written using the IQAN Design which integrated all the components with the Parker IQAN MD-3. This allows communication with the Azure Dynamics, Inc. DMOC motor controller so that speed and torque can be controlled by user inputs. Safety features are included in the program and are designed to warn the user when unsafe parameters exist and safely shut down the machine when necessary.

The processor, its modules and the monitors require twelve (12) and twenty-four (24) volt dc sources. To obtain these voltages required by the controllers and monitors, a dc-dc voltage converter is used to convert the 180 volt dc circuit into lower voltages. A dc-dc converter was chosen from Metric Mind Engineering that produces 45 amps at 12 volts. The dc-dc converter keeps a single 12 volt battery charged that is dedicated to the 12 volt circuit and is used to power all secondary control devices and monitors.

A conductor stringing apparatus includes a frame and a conductor reel about which the conductor is wound. An electric motor is affixed to the frame and coupled to the conductor reel. The electric motor expends electrical energy when pulling the conductor in the pulling mode and the electric motor generates electrical energy when tensioning the conductor in the tension mode. The conductor stringing apparatus includes a processor and a motor controller in combination with the electric motor. The processor is switchable between a pulling mode and a tensioning mode. The processor outputs commands to the motor controller for control of the electric motor. A plurality of batteries is used to apply power to the electric motor and to receive power from the electric motor. The processor applies electrical energy from the batteries to the electric motor when in the pulling mode. The processor applies electrical energy generated by the electric motor to the plurality of batteries when in the tensioning mode. The processor limits electric motor torque and speed based on operator commands for speed and torque in the pulling mode. The processor controls electric motor torque in the tensioning mode.

The three phase electric motor consumes electrical energy in the pulling mode. The Azure Dynamics Inc. motor controller converts direct current into alternating current according to a command message from the Parker IQAN MD-3 controller and applies it to the three phase alternating current electric motor. Other three phase electric motors may be used with separate stand-alone motor controllers. Further, direct current motors may be used with appropriate controls.

The conductor stringing apparatus includes a resistor bank. The processor applies electrical energy to the batteries and to the resistor bank. The processor periodically applies electrical energy to the resistor bank using a pulse width modulation control signal to a control relay. Alternatively, a solid state relay or an insulated gate bipolar transistor may be used. Pulse width modulation is employed wherein the processor controls the application of control signals to the gate of an insulated gate bipolar transistor. The electric motor is an alternating current motor and the motor controller converts direct current battery power to alternating current power. The motor controller converts alternating current power into direct current power for application to the battery or to the resistor bank. A charger for charging the batteries from an external AC power supply is used to charge the batteries at night or when the apparatus is not in use.

A battery temperature sensor generates a signal representative of the battery temperature and inputs the battery temperature signal into the processor. The processor, using the battery temperature sensor, decides whether to continue operation of the conductor stringing apparatus. If the temperature of the battery is greater than 120° F. then operation for the machine is discontinued. The battery temperature sensor may be a thermocouple in engagement with the first negative battery post of fifteen batteries connected in series.

A process for stringing a conductor is also disclosed and includes the initial step of switching between pulling and tensioning modes as desired. Further steps include controlling an electric motor using a processor and a motor controller. In the preferred embodiment the motor controller-motor combination are supplied by Azure Dynamics, Inc. Electrical energy from a plurality of batteries is consumed in the electric motor when pulling a conductor in pulling mode. The electric motor generates electrical energy and charges the plurality of batteries under certain conditions when tensioning a conductor in tensioning mode. Battery voltage is continuously monitored and when it reaches 198 volts dc, the processor begins applying current to the resistor bank to dissipate the energy in the form of heat. The processor limits the electric motor torque and speed based on operator commands for speed and torque in the pulling mode. The processor controls the electric motor torque in the tensioning mode and thus provides tension to the system. The process for stringing a conductor further comprises the steps of dissipating excess electrical energy in a resistor bank when the voltage measured across the string of 15 batteries in series is equal or greater than 198 volts dc.

Accordingly, the process for stringing a conductor includes the steps of measuring battery voltage, processing the battery voltage, and, controlling the dissipation of excess electrical energy in the resistor bank depending on the battery voltage. The step of controlling the dissipation of excess electrical energy in the resistor bank includes modulating the pulse width of a control signal to a switching device in series with the resistor bank. Preferably, the switching device is a control relay, an insulated gate bipolar transistor, or a solid state switching device. Application of the pulse width begins at 198 volts dc and continues and increases linearly up to and including 215 volts dc.

The process for stringing a conductor includes the steps of: monitoring battery temperature; and, discontinuing the stringing operation when the battery temperature exceeds a temperature limit of 120° Fahrenheit. The battery temperature is sensed from a thermocouple engaged with the first negative battery post of the string of 15 batteries.

It is an object of the invention to provide an electric conductor stringing puller-tensioner for the electric utility industry which is capable of energy recovery in the tensioning mode.

It is an object of the invention to provide an electric conductor stringing puller-tensioner which is of the multi-drum type for the electric utility industry which is capable of energy recovery in the tensioning mode.

It is an object of the invention to provide an electric bullwheel tensioner for the electric utility industry which is capable of energy recovery in the tensioning mode.

It is a further object of the invention to provide an electric conductor stringing puller-tensioner with an energy management system for handling energy recovered in the tension mode.

It is a further object of the invention to provide an electric conductor stringing puller-tensioner for the electric utility industry which employs pulse width modulation control in dividing energy between storage batteries and a resistor bank for dissipating energy as heat.

It is a further object of the invention to provide an electric conductor stringing puller-tensioner for the electric utility industry which controls the speed of the reel between upper and lower torque values.

It is a further object of the invention to provide an electric bullwheel tensioner having positive control of the conductor or wire released under tension.

It is a further object of the invention to provide an electric conductor stringing puller-tensioner for the electric utility industry which employs an insulated gate bipolar transistor to implement pulse width modulation control of the resistor bank.

It is a further object of the invention to provide an electric conductor stringing puller-tensioner for the electric utility industry which employs a solid state switch device to implement pulse width modulation control of the resistor bank.

It is a further object of the invention to provide an electric conductor stringing puller-tensioner for the electric utility industry which employs a control relay to implement pulse width modulation control of the resistor bank.

It is a further object of the invention to provide an electric conductor stringing puller-tensioner apparatus which employs an alternating current motor controlled by a motor controller which converts direct current to alternating current.

It is a further object of the invention to provide an electric conductor stringing puller-tensioner for the electric utility industry which is environmentally compatible and efficient.

It is a further object of the invention to provide an electric conductor stringing puller-tensioner apparatus for the electric utility industry which is capable of energy recovery in the tension mode.

It is a further object of the invention to provide an electric conductor stringing puller-tensioner apparatus for the electric utility industry which is capable of energy recovery in the tension mode and which is controllable based on battery bus voltage.

It is a further object of the invention to provide an electric conductor stringing puller-tensioner apparatus for the electric utility industry which is capable of battery management and protection based on the temperature of the batteries.

It is a further object of the invention to provide an electric conductor stringing puller-tensioner apparatus for the electric utility industry which employs a thermocouple attached to the negative post of the battery connected to the negative battery bus.

Further objects of the invention will be understood when reference is made to the drawings, description of the invention and claims which follow hereinbelow.

BRIEF DESCRIPTION OF THE DRAWINGS

FIG. 2C is a cross-sectional view of the conductor stringing puller-tension of the instant invention taken along the lines 2C-2C of FIG. 2B.

FIG. 2E is a sectional drawing taken along the lines of 2E-2E of FIG. 2B illustrating the battery securement.

FIG. 2F is a sectional drawing taken along the lines of 2F-2F of FIG. 2B illustrating the battery securement.

FIG. 2G is a perspective view of a battery and terminals.

FIG. 2H is an enlargement of a portion of FIG. 2G illustrating a screw in the negative most terminal.

A better understanding of the drawings will be had when reference is made to the description of the invention and the claims which follow hereinbelow.

DESCRIPTION OF THE INVENTION

Figure 1:
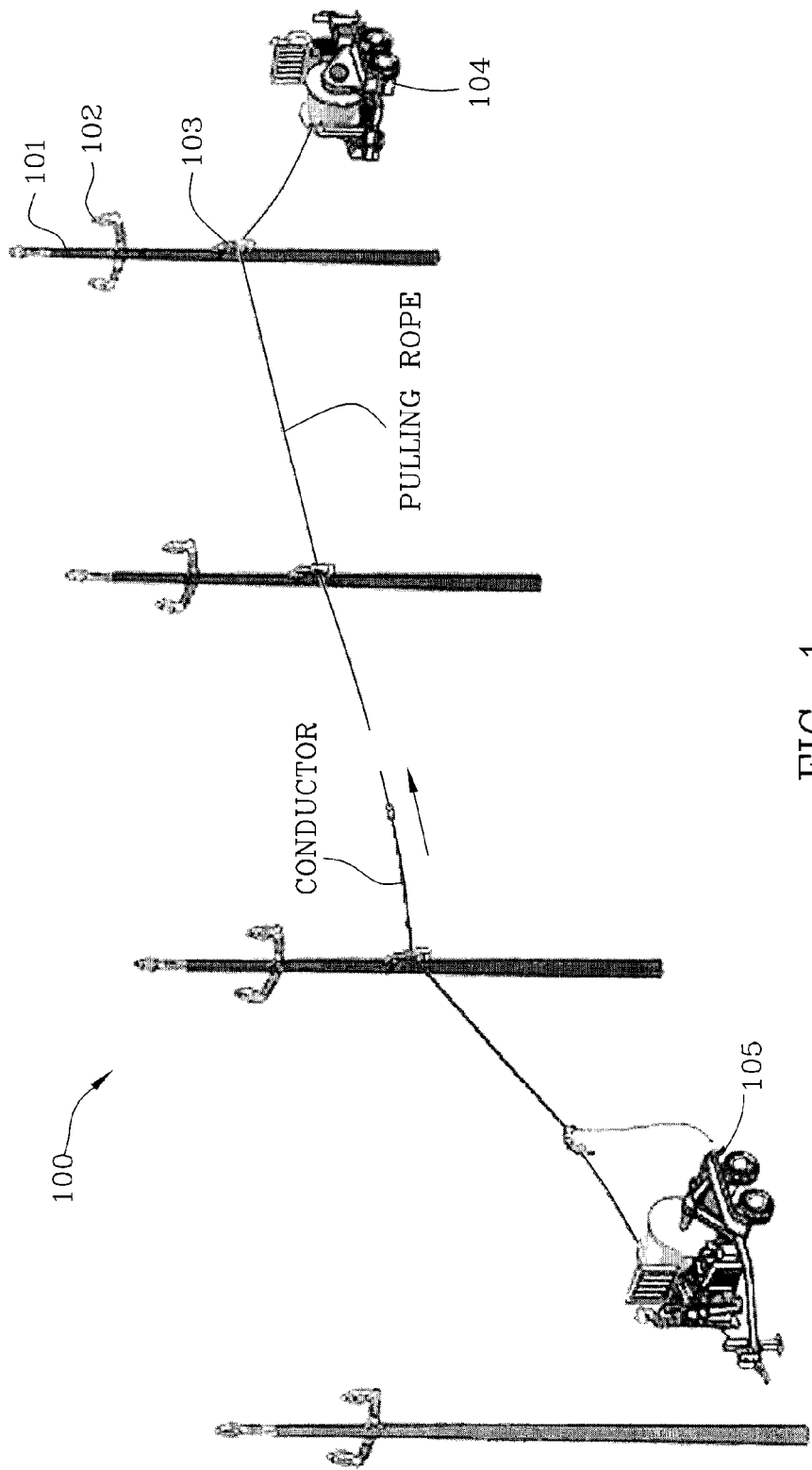
FIG. 1 is a prior art illustration of a conductor stringing tensioner and puller.

FIG. 1 is an illustration 100 of a conductor stringing tensioner 105 and puller 104. Poles 101 and insulators 102 are illustrated as is a conductor pulling rope and conductor. Insulators 102 and stringer attachment 103 are illustrated in FIG. 1 as is the traveling ground.

Figure 2:
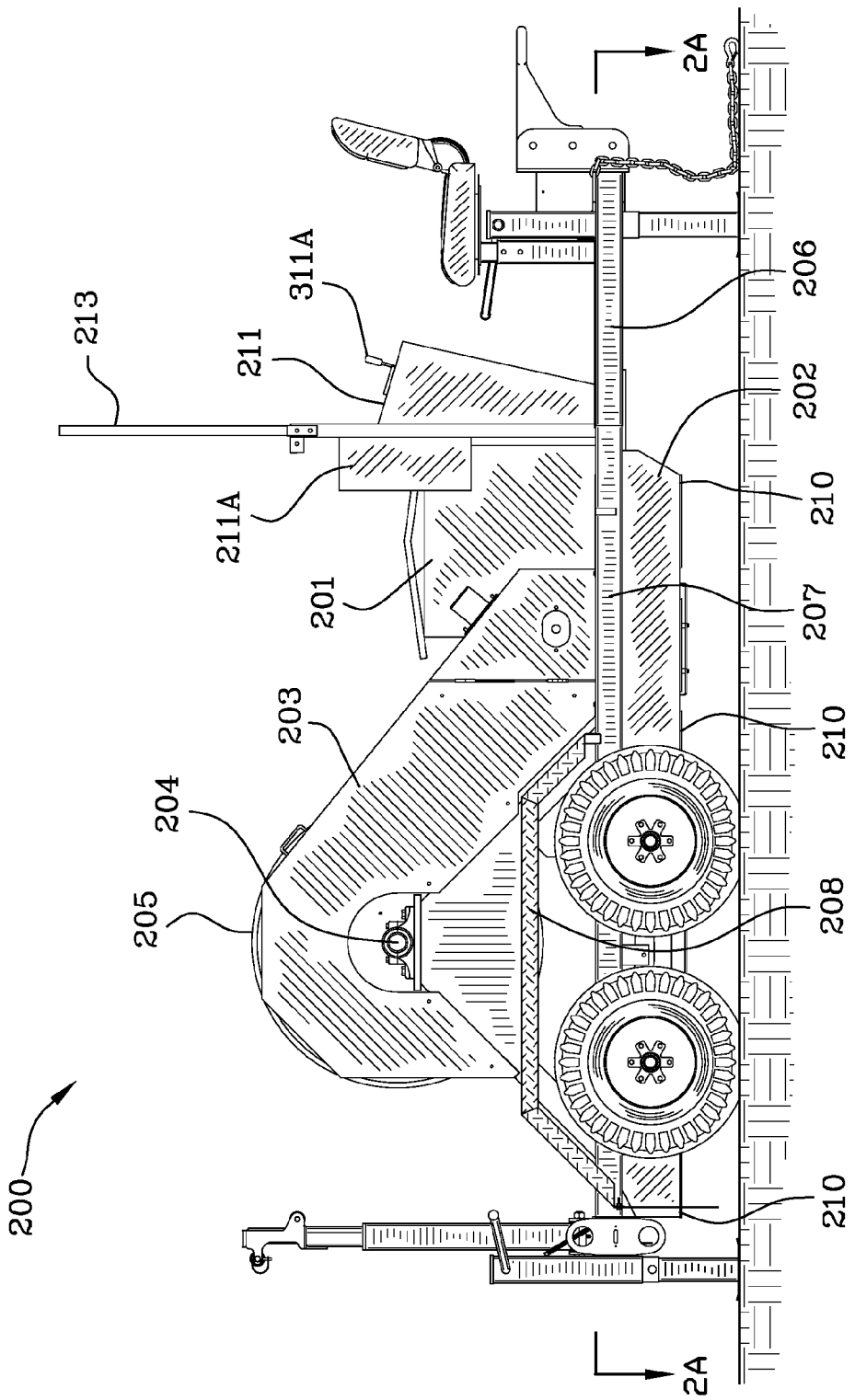
FIG. 2 is a side view of the conductor stringing puller-tensioner of the instant invention.

FIG. 2 is a side view 200 of the conductor stringing puller-tensioner of the instant invention illustrating the resistor bank cabinet 201, control panel 211, and control box housings 211A, 211B. An operator of the device is protected by a protective screen 213 in the event of a rope or conductor break under tension. Joystick 311A can be seen in FIG. 2 protruding from the control panel. Batteries are secured in an undercarriage formed of channel 210 which is obscured from view in FIG. 2 by battery skirt 202. Chain guard 203 protects a person from entanglement with a chain (not shown) which operates between a small sprocket (not shown) having 19 teeth per revolution and a large sprocket (not shown) having 84 teeth per revolution. Reel 205 upon which conductor or rope is wound and reel shaft 204 are viewed well in FIG. 2. An outer frame 206 supports the operator and his or her chair as well as the control panel. The main frame 207 supports the batteries, the electric motor, the chain and the conductor/rope reel. Wheel covering/wheel guard 203 is illustrated over wheels/tires. The outer and main frames 206 are covered with metal plates enabling limited mobility of the operator around the machine.

Figure 2A:
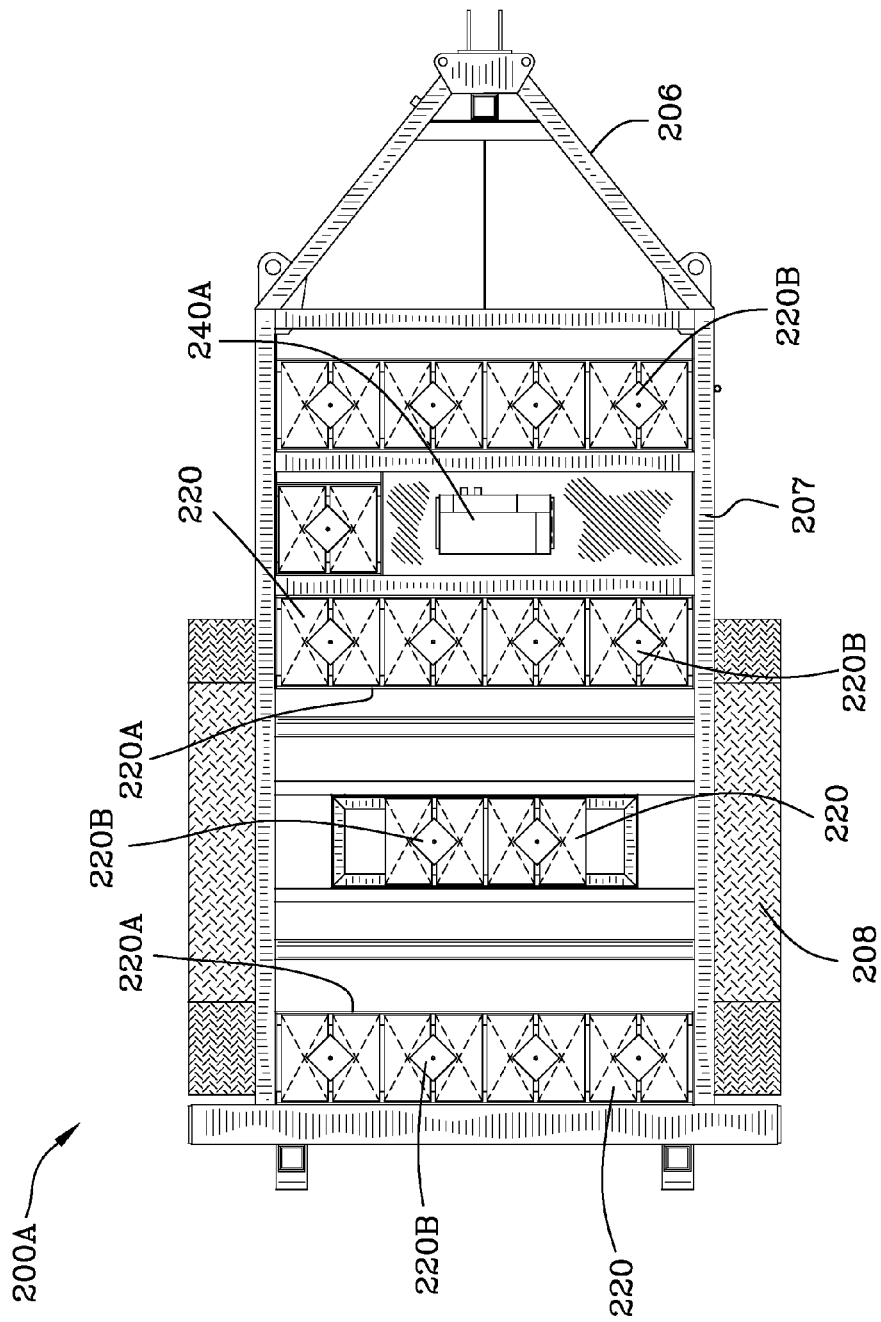
FIG. 2A is a view taken along the cross-sectional lines 2A-2A of FIG. 2.
Figure 2B:
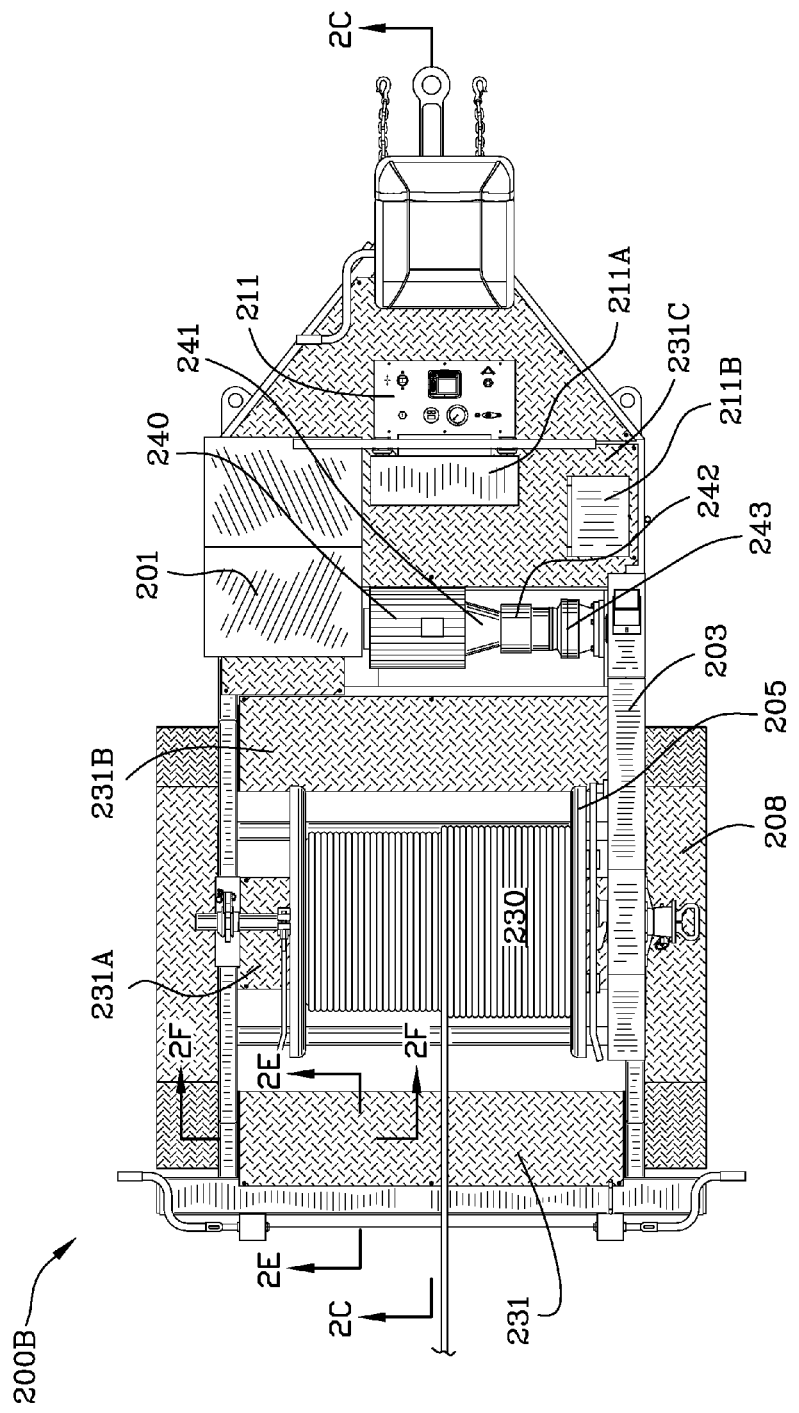
FIG. 2B is a top view of the conductor stringing puller-tensioner of the instant invention.

FIG. 2A is a view 200A taken along the cross-sectional lines 2A-2A of FIG. 2. Batteries 220 are illustrated residing in channels 210. Channels 210 include upwardly extending portions 220A. Motor controller 240A is illustrated in FIGS. 2A and 2C. FIG. 2B is a top view 200B of the conductor 230 stringing puller-tensioner of the instant invention. Flooring-battery covering 231, 231A, 231B and 231C are metal plates which are attached to the frame 206, 207 with screws or other attachment means as shown in FIG. 2B. Battery hatch 211B allows access to battery 319 which supplies start-up control power to the 12 volt dc circuit illustrated in FIG. 3A. The flooring-battery coverings reside over the batteries and enable limited movement by the operator or maintenance personnel on the device. The batteries 220 are held in place by tie-downs 220B as illustrated in FIG. 2B.

The batteries may be replaced periodically for maintenance, repair or substitution of a fresh fully charged battery. Alternatively, an auxiliary trailer having thirty (30) fully charged 12 volt dc batteries may be placed in proximity to the conductor puller-tensioner as a supplemental energy source for longer pulls. The auxiliary batteries may be coupled by using a socket and plug interconnection 320. Reference numeral 320 diagrammatically illustrates the socket and plug and includes necessary electrical interconnection and extensions to the supplemental energy source.

Figure 3:
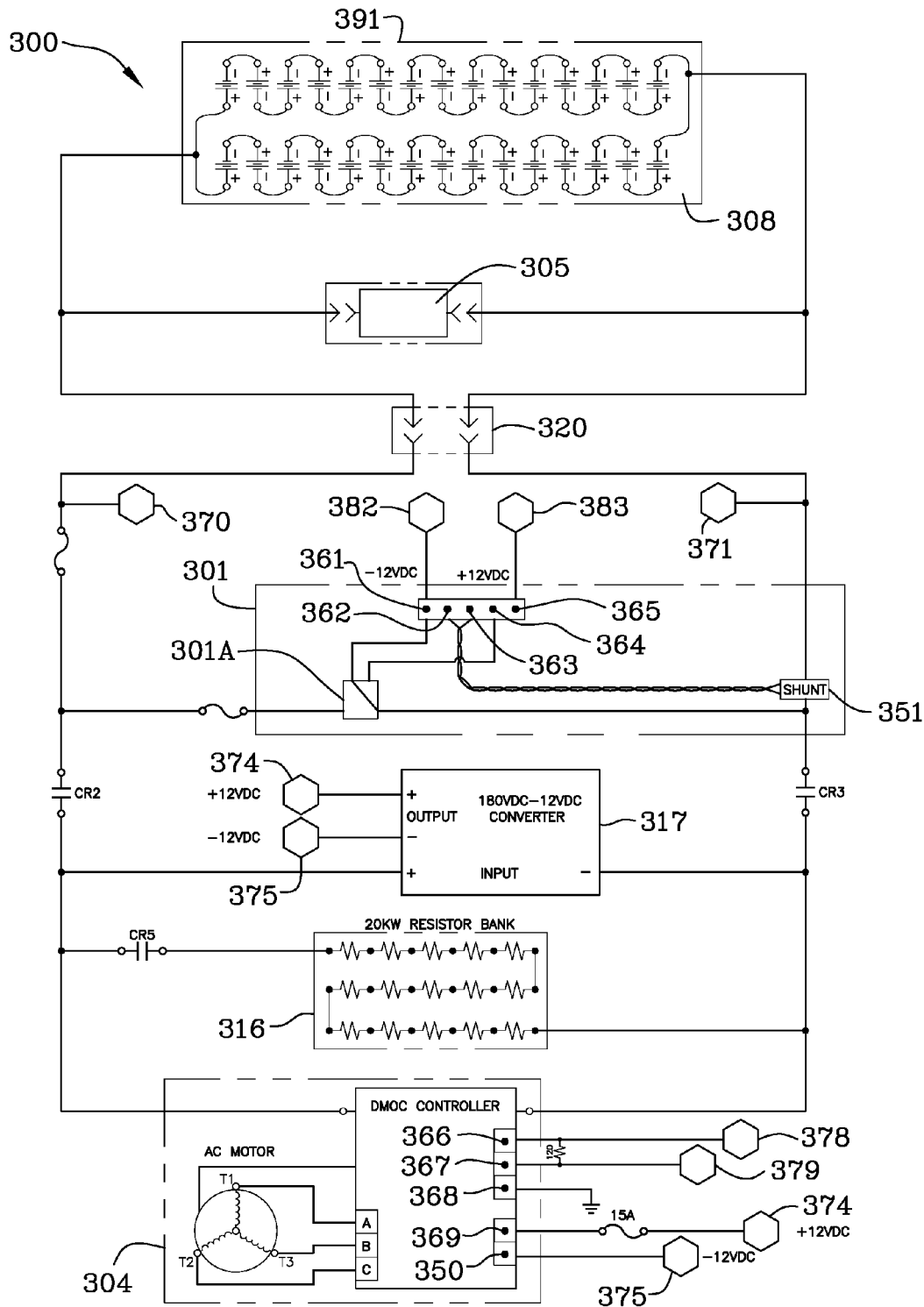
FIG. 3 is a schematic ladder diagram of the 180 volt dc circuit which includes the batteries, the resistor bank, the three phase electric motor and motor controller.

FIG. 3 is a schematic ladder diagram 300 of the nominal 180 volt dc circuit which includes batteries 220, resistor bank 316, alternating current motor 240, and DMOC motor controller 240A. As for the resistor bank, it is a customized grouping of 15 individual resistors from Milwaukee Resistor's Edge Power product line. Five (5) 2.75 ohms resistors are in parallel with each other and form a set. Each individual resistor has a resistance of 2.75 ohms. Each set of resistors has a resistance of 0.55 ohms and then three sets of the resistors are series with each other for a total resistance of 1.65 ohms.

In FIG. 3, the batteries 220 are illustrated as being connected in series. The power required by the three phase alternating current motor 240 is approximately 27.767 Hp (20.7 Kw) and the required torque is approximately 70,000 in-lbs. The reel sprocket (not shown) includes 84 teeth per revolution and the motor sprocket (not shown) includes 19 teeth per revolution. The sprockets reside within the chain guard 203 and are not visible. The reduction of the gearbox is 15.3:1 and the total reduction is 67.642 which yields a torque requirement of 1,034. 8 in-lbs (116.9 N-m). The required reel speed is 25 rpm which yields a required motor speed of 1691 rpm. Different speeds, torques and gear reductions may be used as will be recognized by those skilled in the art without departing from the spirit and scope of the invention as set forth herein.

Figure 3A:
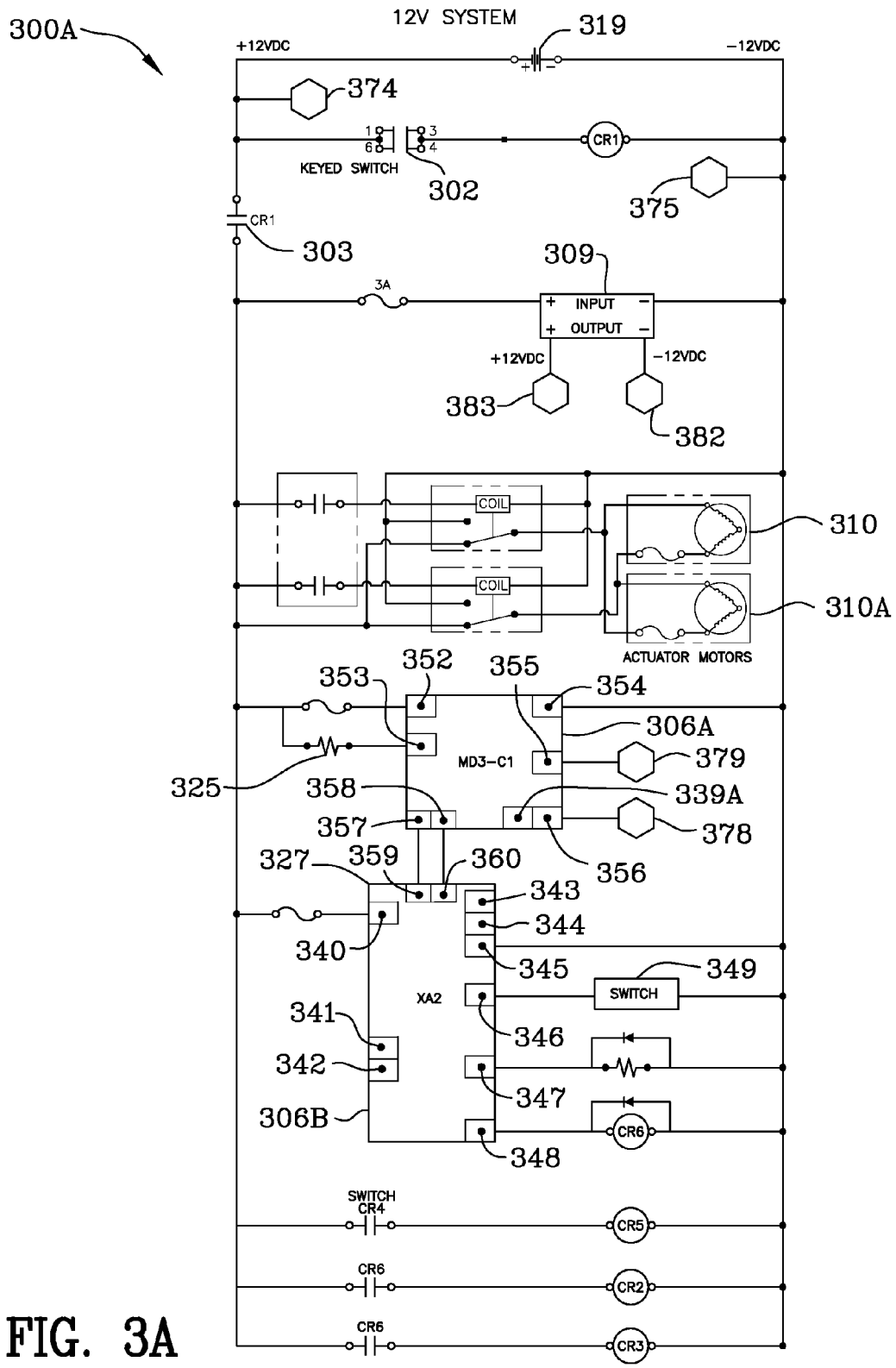
FIG. 3A is a schematic ladder diagram of the 12 volt dc circuit which includes the modules of the processor, various relays, and the Insulated Gate Bipolar Transistor.

Still referring to FIG. 2B, conductor 230 is illustrated wound on reel 205. Level winds 310B, 310C are illustrated in FIG. 3A which are responsible for winding and unwinding the rope or conductor onto and off-of reel 205 in an orderly fashion for efficient storage and payout. Adapter 241, multi-disc brake 242 and gearbox (gear reducer) 243 are illustrated in FIG. 2B.

Figure 2D:
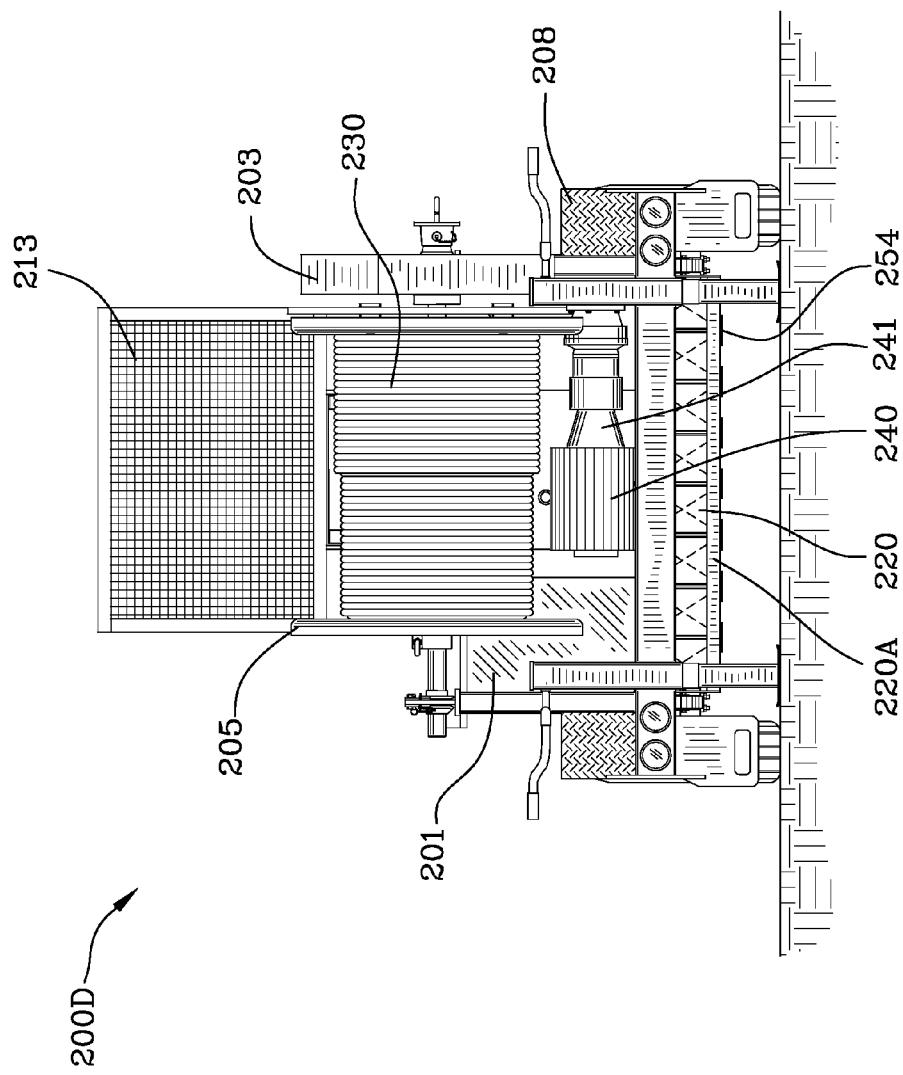
FIG. 2D is a rear view of the conductor stringing puller-tensioner of the instant invention.

FIG. 2C is a cross-sectional view 200C of the conductor stringing puller-tensioner of the instant invention taken along the lines 2C-2C of FIG. 2B with the reel and the three phase alternating current motor removed. FIG. 2C illustrates the batteries 220 and their placement in the channel 210 and the upwardly extending portion 220A of the channel FIG. 2D is a rear view 200D of the conductor stringing puller-tensioner of the instant invention.

FIG. 2E is a sectional view 200E taken along the lines of 2E-2E of FIG. 2B illustrating the battery securement. Tie down rod 252 which may be partially threaded rod or it may be threaded along its entirely length. Rod 252 is connected to the lower plate 254 which traverse channels 210. Nut 256 threads onto the tie down rod 252 and applies pressure to upper plate 220B against the batteries 220. Reference numeral 258 is the side wall of the battery enclosure. FIG. 2F is a sectional view 200F taken along the lines of 2F-2F of FIG. 2B illustrating the battery securement.

FIG. 2G is a perspective view 200G of a battery 220 and terminals 261, 262. FIG. 2H is an enlargement 200H of a portion of FIG. 2G illustrating a threaded screw 265 in the negative most terminal 262. Reference numeral 263 indicates the female threads within post/terminal 262. Thermocouple 264 may be affixed into engagement with the terminal 262 to monitor the temperature of the battery.

Referring to FIG. 3, a schematic ladder diagram 300 of the nominal 180 volt dc power system is illustrated. The voltage is referred to as nominal, meaning ordinary or expected. However the voltage across the battery strings arranged in parallel with each other varies. Specifically, in the tensioning mode, if the voltage exceeds 198 volts dc, then the 20 kW resistor bank 316 dissipates some of the energy according to the width of a pulse width modulation control signal applied to a relay, solid state switching device, or an insulated gate bipolar transistor 349. Insulated gate bipolar transistors function as a switch applying current to the resistor bank. Alternatively, contacts of CR 5 may be used to control the application of the regenerated energy from the alternating current motor 240/DMOC controller/processor 240A to the resistor bank.

Figure 3B:
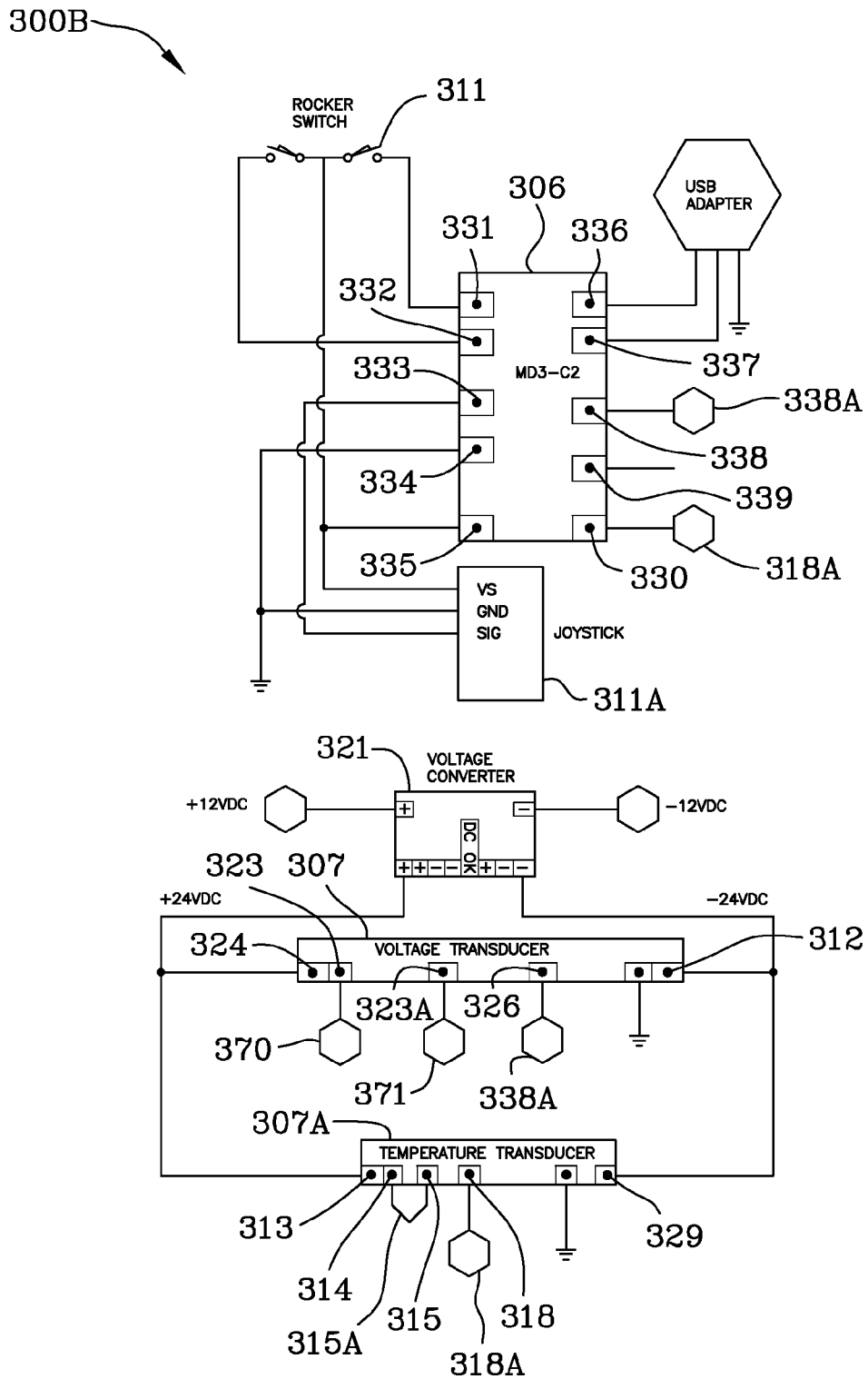
FIG. 3B is a schematic illustrating: a processor module, rocker switches, joystick, the voltage transducer monitoring the 180 volt dc circuit and the temperature transducer monitoring the battery temperature.
Figure 3C:
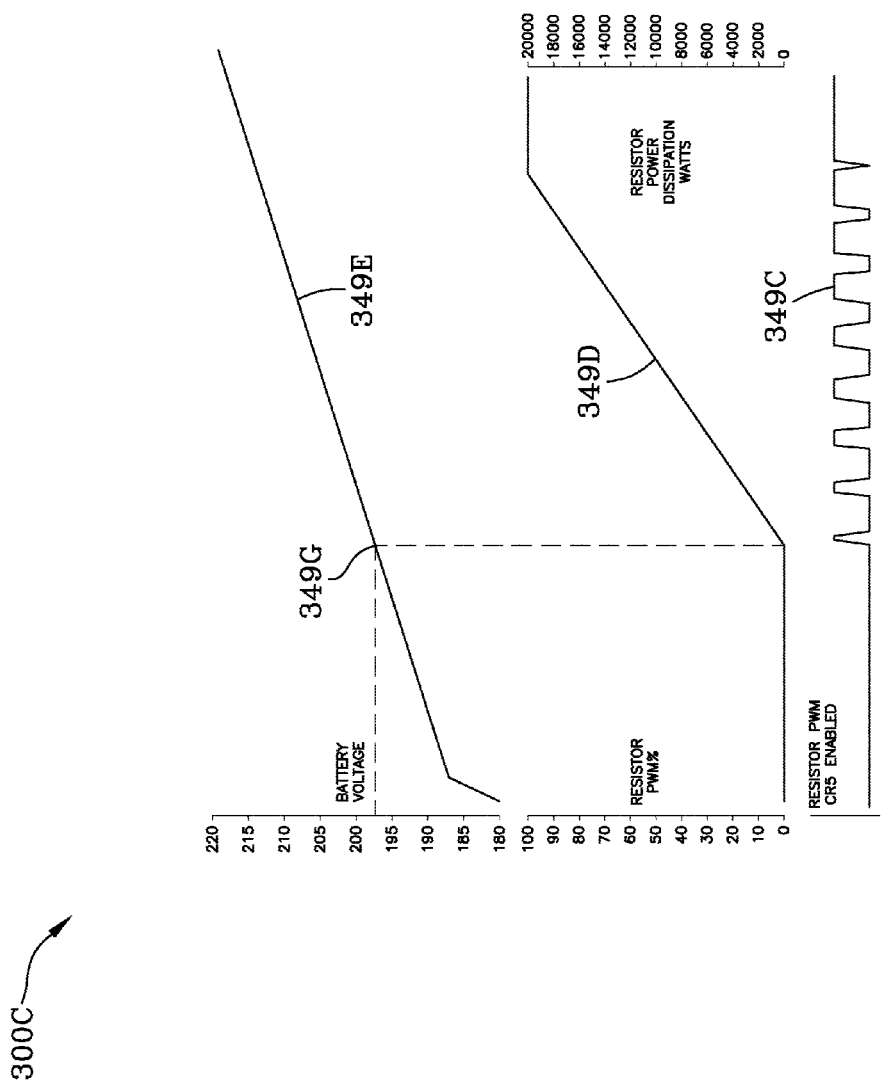
FIG. 3C illustrates operation of the resistor bank and the pulse width modulation control signal.
Figure 3D:
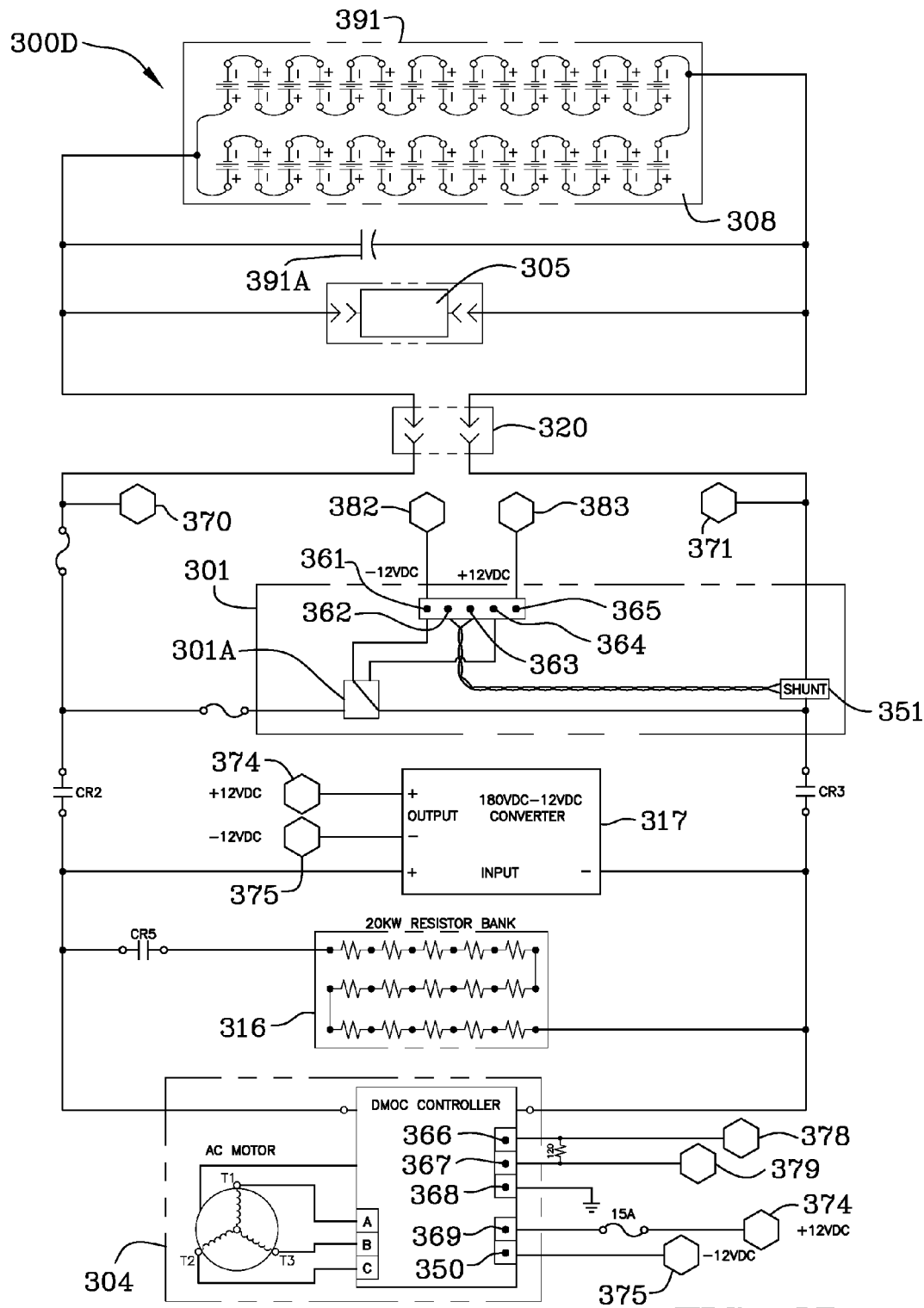
FIG. 3D is a schematic ladder diagram of the 180 volt dc circuit which includes the batteries, the resistor bank, the three phase electric motor, motor controller and an ultracapacitor in parallel.

Alternatively, an ultra-capacitor 391 may be used in parallel with the string of batteries as illustrated on FIG. 3D. FIG. 3D and FIG. 3 illustrate the same components only FIG. 3D includes the ultra-capacitor capable of storing a large amount of charge. Ultra-capacitors or electrochemical double layer capacitors (EDLC), are electrochemical capacitors that have an unusually high energy density when compared to common capacitors, typically on the order of thousands of times greater than a high-capacity electrolytic capacitor. Ultra-capacitors store several are capable of storing many farads and some large commercial ultra-capacitors have capacities of thousands of farads.

The three phase alternating current motor 240 (Azure Dynamics Inc. Model no. AC55) and the DMOC motor controller 240A are supplied by Azure Dynamics Inc. of Woburn, Mass. as a motor/controller package. The three phase alternating current motor is rated for 34 kW continuous power, 240 N-m peak torque, and 8,000 rpm maximum speed. Other electric motor-motor controller packages may be used as those skilled in the art will readily recognize for different loads and machine characteristics.

Referring to FIG. 3, the high voltage power source is comprised of thirty (30) deep cycle twelve (12) volt batteries 220 that are rated at 150 amp-hours each. Fifteen (15), twelve (12) volt dc batteries 220 are wired in series to form the nominal 180 volt dc circuit. Two of the fifteen (15), twelve (12) volt battery strings are wired in parallel resulting in a 180 volt pack with a 300 amp-hour capacity. Trojan T-1275 Plus, 12 volt dc, lead acid deep cycle batteries with 150 amp-hour capacity are the preferred batteries 220. The batteries may be charged in the tension mode as explained herein or they may be charged overnight or when the puller-tensioner is not in operation by employing charger 305. Charger 305 is a Nivan Charger having an input source voltage of 230 volts AC and can draw 30 Amps. Charger 305 outputs 180 volts DC. At a voltage of 180 volts dc, the maximum current draw will be about 115 amps to supply a motor load of 20.7 kW. The maximum current draw will only be reached close to the end of a conductor stringing operation.

Voltage across the battery strings is monitored 370, 371 by a voltage transducer illustrated in FIG. 3B. FIG. 3B is a schematic 300B illustrating: a processor module 306, rocker switches 311, joystick 311A, voltage transducer 307 monitoring the 180 volt dc power system and the temperature transducer 307A monitoring the battery temperature. Processor 306, 306A, 306B, and the DMOC motor controller 240A use CAN program parameters for communication and processing. The voltage transducer 307 monitors the voltage 370, 371 on terminals 323, 323A and outputs (from terminal 326) a signal 338A which is input into and communicates with terminal 338 of processor 306. Processors 306, 306A, and 306B are an IQAN Parker Hannifin MD-3 processor. Processor 306 includes terminal 339 which communicates with terminal 339A of module 306A. Expansion module 306B includes terminals 359, 360 which communicate with terminals 357, 358 of module 306A.

Voltage monitoring across the battery strings is important as the voltage may increase during tensioning mode and the batteries are limited as to how much energy or charge them may accept per unit time and contain. The voltage transducer requires a 24 volt dc supply which is supplied at pins 324, 312 of the transducer. Voltage converter 321 is powered from the 12 volt dc logic circuit illustrated in FIG. 3A and steps up the voltage to 24 volts dc for application to the voltage transducer 307 and the temperature transducer 307A.

At a voltage of 198 volts dc as monitored across the nominal 180 volt dc power supply circuit, the processor begins to modulate the amount of energy applied to the batteries and directs the energy to the resistor bank 316. At 198 volts DC the processor enables relay CR4 (SWITCH 349) which is output from terminal 346 of processor module 306B. Engineering units of volts dc across the battery string are converted by a CAN program into counts for use within the CAN program. Energization of relay CR 4 closes contact CR4 which then allows current to flow in the circuit and then applies power to energize relay CR5. Upon energization of relay CR5, contacts CR5 in series with resistor bank 316 enables application of current for the dissipation of energy in the resistor bank 316.

FIG. 3C illustrates 300C operation of the resistor bank pulse width modulation control signal. Specifically, reference numeral 349E illustrates the battery voltage. Reference numeral 349D indicates the resistor power dissipation in Watts. Reference numeral 349C illustrates the pulse width that corresponds to a particular voltage in the range of 198 volts to 215 volts dc. Reference numeral 198 illustrates that when the voltage across the battery strings reaches 198 volts dc, a resistor pulse width modulation signal is applied to CR4 (or other switching device) which controls relay contacts CR5 in series with the resistor ban. The pulse width modulation signal begins at 198 volts dc and increases linearly such that when 215 volts dc is reached the application of current to the resistor bank is constant, specifically, current is applied 100% of the time and 20 kW is dissipated in the resistor bank. The resistor bank dissipates 20 kW and is comprised of sets of resistors which have a total resistance of 1.65 ohms. Specifically there are three sets of resistors in series with each set having five 2.75 ohm resistors arranged in parallel.

The invention includes a battery charging algorithm. Checks and balances are used during tensioning for a safe battery pack charge. Voltage, current, and temperature are all used in the program to control it. Generally, charging current of a battery system is equal to Current/10, where Current is the 20 hr capacity of the system. Each battery string employs batteries having a 150 Amp-hour capacity. System capacity is 300 Amp-hours because two battery strings are used so charging current is nominally 30 amps.

Current is not measured directly and externally to the DMOC motor controller 240A. Current is calculated from the power generated from tensioning. We have inputs for speed and torque from the DMOC motor controller 240A, so horsepower is calculated from the formula Horsepower=(ft-lbs*rpm)/5252. Horsepower is then converted Watts as 746 Watts is approximately equal to 1 horsepower. Current in Amps is equal to Watts/Volts. The program uses torque, speed, voltage, current and temperature for use in operating the resistor bank and charging the batteries.

The program uses these values to decide if, and how much to pulse the resistors. If the charge rate is below 30 amps, and if the voltage is below 198 VDC, and if the temperature is below 118 degrees F., then the resistors are not used, or pulsed at zero percent.

There are three calculations made to determine the pulse rate of the resistors. They are all a percentage of the total resistive power. The program picks the largest value to use as the actual PWM percentage employed.

Formula 1: Current based pulse width modulation percentage.

A charge current of 30 amps is the nominal charging current. Potential resistive power of the resistor bank is determined by squaring the voltage and dividing by the resistance. Resistance of the resistor bank is a constant 1.65 ohms as explained elsewhere herein. Voltage of the 180 volt circuit is not constant and is changing depending on operational conditions and, as such, the potential power is also changing. Power is calculated from the tensioning. Power in the batteries is 30 amps multiplied by the instantaneous voltage and may range from 5.4 kW to 6 kW, more or less. Power supplied to the batteries is subtracted power from the power determined and generated by the tension and what remains, for example, the difference is the power dissipated in the resistor bank. Power to be dissipated in the resistor bank is divided by the potential resistive power and is multiplied by 100 to get a pulse width modulation percentage. This is the PWM percentage determined using a current analysis.

Formula 2: Voltage based pulse width modulation percentage.

The calculation for voltage is much simpler than the calculation for current. The battery voltage should not exceed 217 volt dc but needs to be above 190.5 volts dc to charge the batteries. A linear calculation between 198 and 215 volts dc is used to determine a linear pulse width modulation percentage. In other words, the pulse width varies between 0 and 100 percent as the voltage varies between 198 and 215 volts dc. Consequently, this is the formula that is used most often by the program because even if the charge rate is below 30 amps the voltage increases.

Formula 3: Temperature based pulse width modulation percentage.

The temperature of the batteries does not exceed 120 degrees F. When the temperature reaches 118 degrees F., we equal the tension power and resistive power so that there is no charge or discharge in the batteries and the resistors handle all of the current.

Again, these three formulas all calculate a percentage. The greatest percentage is the one that the program uses.

Battery temperature is monitored by the battery transducer 307A. Engineering units of degrees Fahrenheit are converted into counts for use in the CAN program. The temperature transducer circuit is supplied by the voltage converter 321 with 24 volts dc across terminals 313, 329. A thermocouple input 315A is applied across terminals 314 and 315 of the temperature transducer. The temperature transducer 307A outputs a signal 318A on pin 318 which communicates with pin 330 on processor 306. If battery temperature exceeds 120° F. then the machine is shut down and relay contacts CR2 and CR3 in the 180 volt circuit open. Relay contacts CR2 and CR3 open as the output of pin 348 goes to zero and disables relay CR6. With relay CR6 de-energized, contacts CR6, CR6 open de-energizing relay contacts CR2, CR3 which result in the isolation of the battery strings 220 from electric motor 240/ motor controller 240A and from the dc-dc converter 317.

The 12 volt dc control circuit is supplied by the output 374, 375 of the 180 vdc-12 vdc converter 317 illustrated in FIG. 3. Converter outputs 374, 375 are also viewed in the upper portion of FIG. 3A. Referring to FIG. 3A, voltage isolating converter 309 supplies 12 volts dc from unnumbered terminals and communication points 382, 383 to battery meter 301 (FIG. 3) as indicated by communication points 382, 383 which in turn communicate with pins 361, 365 of the battery meter. The battery meter includes a shunt 351 which provides an input to pins 362, 363 of the battery meter. Prescaler 301A is also used in connection with the battery meter and communicates with terminals 361 and 364 respectively.

Referring to FIG. 3, alternating current three phase motor 240 and DMOC controller 240A are illustrated. Reference numerals A, B, C indicate the three phase inputs to the windings of the motor. Twelve (12) volts dc are applied across terminals 369, 350 of the DMOC through communication with the 12 volt dc supply 374, 375 from the 180 volt dc-12 volt dc converter 317. A CAN control message is applied to pins 366, 367 of the DMOC motor controller 240A. The CAN control message comes from processor 306 pins 355, 356 of the IQAN MD-3 processor 306 and is interconnected 378, 379 to the DMOC controller 240A. Similarly status messages are communicated from the DMOC motor controller 240A back to the processor 306. The DMOC controller 240A applies an algorithm which depends on the operational mode of the processor, for instance, whether the processor is in the tension mode or pulling mode. Further, processor 306 and its modules 306A, 306B are in communication with an interface 406 illustrated in FIG. 4. Voltage, temperature, speed, torque as well as other parameters are displayed on the graphical interface 406.

In the pulling mode, lower torque and upper torque are set by the operator. Speed is also operator controlled in a range of plus and minus 0 to 100% with a dead band of +/−10%, but is limited by the values input for lower and upper torque. The speed regulator is active within the window given by the lower and upper torque limit. The speed set-point as well as the toque limits are transmitted over CAN and may be modified by the DMOC at a rate of 20 hz. If the speed set value can be reached within the torque limits then speed regulation as commanded by the operator speed input is achieved. If the limits are too restrictive, for example, the lower torque and the upper torque are too close together, then the drive becomes essentially torque controlled.

In the tension mode, lower torque is set equal to upper torque and the tensioner acts as a classical torque resistance or tensioner.

Figure 4:
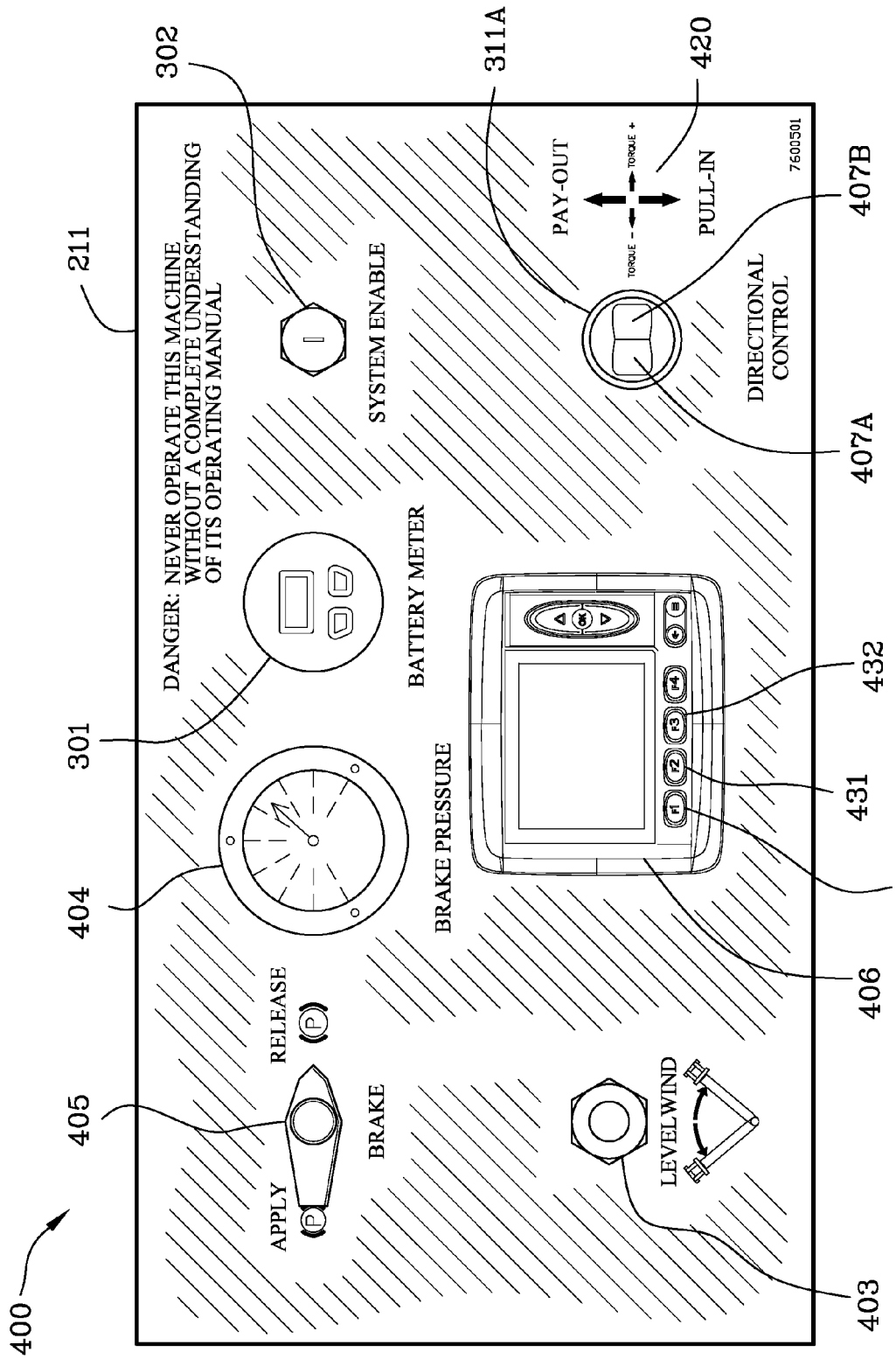
FIG. 4 is an illustration of the control panel.

Referring to FIG. 3B, rocker switch 311 communicates with pins 331, 332 of processor 306. Joystick 311A includes right (increase) and left (decrease) torque pushbuttons. Depressing the right button 407B communicates a torque increase signal to pin 332 of processor 306. See FIG. 4 for an illustration of the torque push button 407A, 407B. Depressing the left button 407A communicates a torque decrease signal to pin 331 of processor 306. Source voltage is applied to pin 335 and ground is applied to pin 334. The speed signal input, directionally indicated as plus-minus 100% is applied to pin 333 of the processor 306. Speed input is controlled by the Joystick single axis forward and reverse movement as indicated in FIG. 4. A USB port communicates with pins 336, 337. The torque inputs to processor 306 are digital inputs and the joystick speed on pin 333, the battery bus voltage on pin 338 and the battery temperature on pin 330 are analog inputs. Torque and speed inputs are user controlled while operating the puller-tensioner.

FIG. 3A is a schematic ladder diagram 300A of the 12 volt dc circuit which includes the modules of the processor 306A, 306B, relays CR1, CR4, CR5, CR2, CR3, level wind actuator motors 310, 310A and switch 349. Battery 319 supplies energy for the control logic set forth in FIG. 3A before the puller-tensioner is started. A DC-DC converter 317 keeps the 12 volt dc battery 319 charged via interconnection points 374, 375 of the converter 317 and interconnection points 380, 381 of the 180 volt dc circuit. Key switch 302 energizes relay CR1 which is a permissive to application of power to the isolating DC-DC converter for the battery meter 301, the level wind actuators 310, 310A and the processor 306, 306A, 306B. Switch 302 is also viewed on FIG. 4 and is labeled system enable.

Processor module 306A is powered by the 12 volt dc bus at terminals 352, 354 as illustrated in FIG. 3A and socket relay indicates that the processor is active. Similarly processor module 306B is supplied with power at pins 340, 345. RS 232 communication is accomplished at terminals 343, 344 of module 306B. An address tag is communicated at terminals 341, 342 of module 306B. Processor 306B drives the brake disable relay which controls the electric brake 242 contained within the electric motor-electric motor brake housing. Electric brake 242 is applied when the electric motor 240 is commanded to shutdown when the battery temperature exceeds 120° F.

Still referring to FIG. 3A, control relays CR2 and CR3 are enabled when relay CR6 is energized closing contacts CR6, CR6. Control relay CR6 is energized when the joystick 311A is centered or it is within its dead band zone (plus-minus 10% of being centered) and the holding electric brake 242 is off. When CR6 is energized two sets of contacts CR6 are enabled which, in turn, enable CR2 and CR3 which then energizes the 180 volt dc circuit upon the closure of contacts CR2, CR3 as illustrated in FIG. 3.

FIG. 4 is an illustration 400 of the control panel 408. Control panel 408 is viewed by the operator and informs the operator as to several important parameters. First, key 302 enables the system. Battery meter 301 indicates the voltage across the battery strings. Brake pressure 404 is the pressure applied by the brake within the motor-brake assembly. The electric brake can be manually applied by the operator through toggle brake arm 405. The direction 403 of the level wind is controllable as is viewed in FIG. 4. Joystick 311A and torque increase 407B and torque decrease 407A buttons are illustrated. Indicia 420 instructing the operator as to operation of the joystick (payout and pull-in) and the torque inputs is applied to the control panel 408.

Master control interface 406 is illustrated in FIG. 4 having a display screen for conveying information to the operator. F1, designated by reference numeral 430, is depressed to enter the puller mode. F2, designated by reference numeral 431, is depressed to enter the tensioning mode. Button F3, designated by reference numeral 432, is depressed to enter the diagnostic mode.

In the pulling mode, input and actual speed and torque are displayed. Battery temperature and voltage are also displayed. The operator may also reset the torque by depressing one of the arrow buttons on the controller (processor) interface 406. The controller temperature is also indicated.

In the tension mode, input and actual speed and torque are displayed. Battery temperature and voltage are also displayed. Also, in the tension mode the percentage of the pulse width modulation being applied is also displayed. A green light is displayed on the processor screen indicating that the controller is operating in the tension mode. The controller temperature is also indicated.

In the diagnostic mode the input and output speed and torque are displayed in parametric indications of the CAN program.

Figure 5:
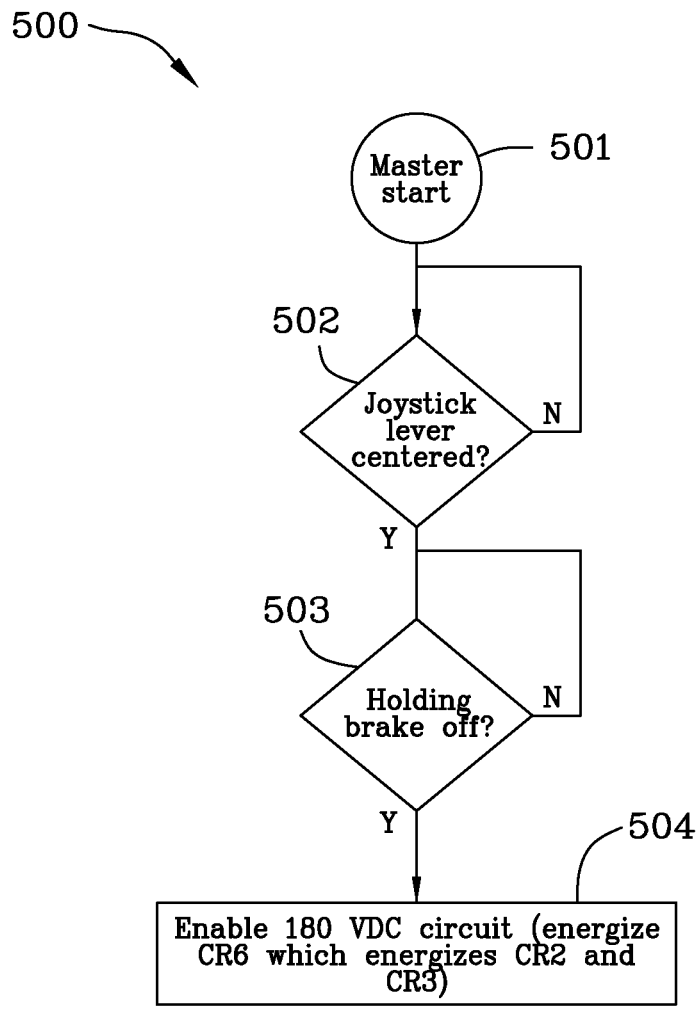
FIG. 5 is a schematic diagram of the master start sequence of the conductor stringing puller-tensioner.

FIG. 5 is a schematic diagram 500 of the master start sequence of the conductor stringing puller-tensioner. Reference numeral 501 indicates the master start sequence. The first query 502 is whether the joystick lever is centered. If the joystick lever is not centered, the operator must center it to enable the 180 volt dc circuit. So, in other words, the joystick must be centered plus or minus 10% as previously indicated as a permissive to starting the puller-tensioner. Next, the holding brake must be off and a query 503 in this regard is represented in the flow chart. If the brake is off then the 180 volt dc circuit can be enabled by energizing control relays CR6, CR2, and CR3. If the holding brake is not off, it must be positioned in the off position. To enable the 180 volt dc circuit, relays CR6, CR2 and CR3 are energized. Therefore, the CAN program requires the joystick to be centered +/−10% and the motor brake 242 must be off.

Figure 5A:
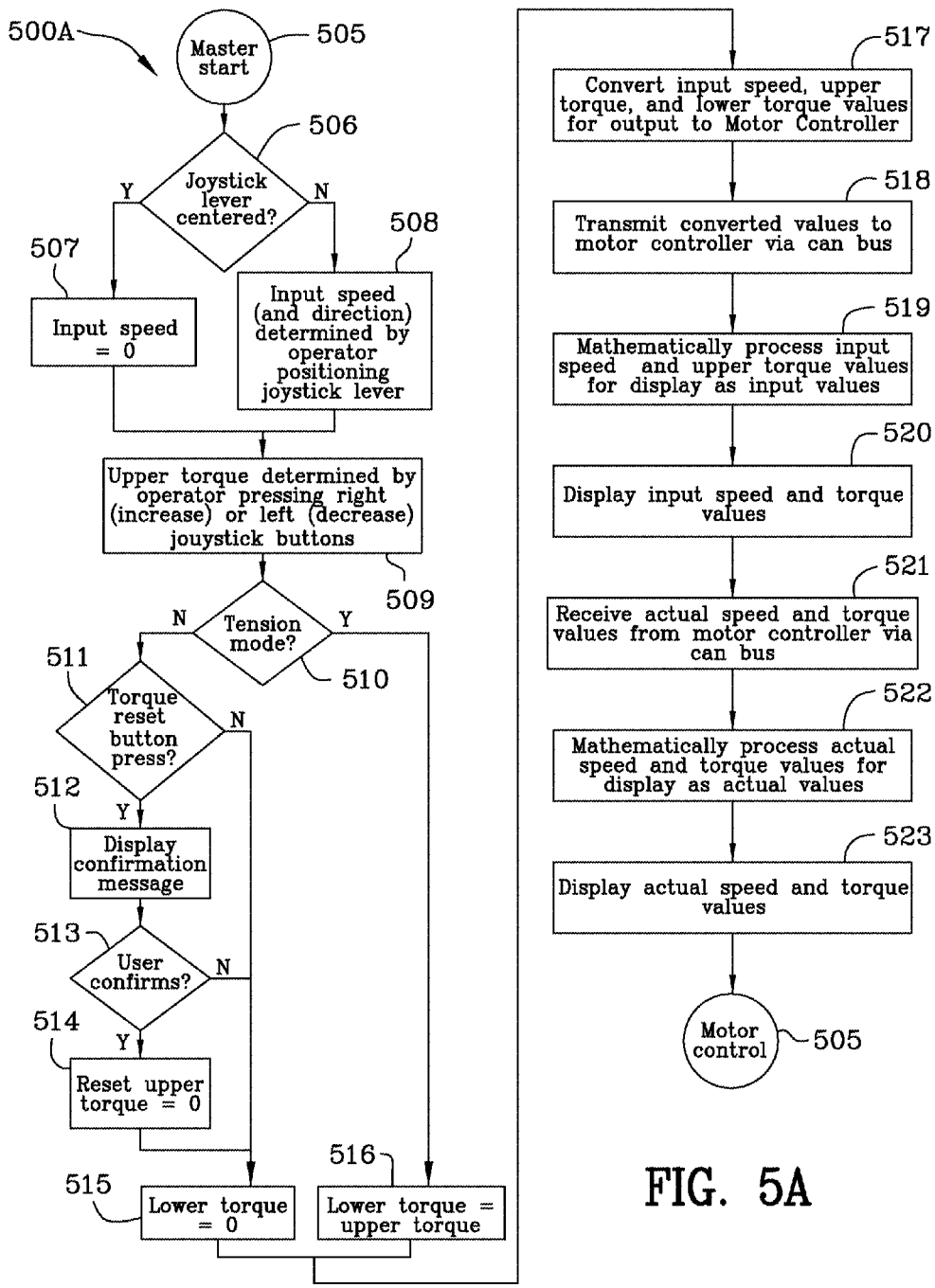
FIG. 5A is a schematic diagram of the motor control for the puller mode and the tension mode of the conductor stringing puller-tensioner.

FIG. 5A is a schematic diagram 500A of the motor control 505 for the puller mode and the tension mode of the conductor stringing puller-tensioner. If the machine was automatically shutdown 506 then the input speed is automatically set to zero 507. If the machine was not automatically shut down then the input speed and direction is determined 508 by the operator positioning the joystick lever. Upper and lower torque is then determined and set by the operator by pressing right 407B or left 407A joystick buttons 509.

If the machine is in the puller mode 510 then a query 511 is present as to whether or not the torque reset button has been pressed. If the torque reset button has not been pressed then the lower torque is set to zero 515 and the upper torque remains as set in step 509. If the torque reset button has been pressed then the reset is confirmed 512, 513 through messages displayed on the interface 406 and the upper torque is set to zero 514 and the lower torque is also zero 515. For this condition, where the pulling mode is active and the reset button is pressed the upper and lower torque are both set to zero. If the torque button has not been depressed then in the pulling mode the motor is operating with an upper torque set by the operator and a lower torque set at zero.

Still referring to FIG. 5A, in tension mode, the lower and upper torque are equal 516 and determined by the upper torque setting 509.

Still referring to FIG. 5A, next, regardless of tension or pulling mode, the input speed, upper torque, and lower torque values are converted into CAN program parameters 517 and transmitted to the motor controller via the CAN bus 518. The input speed and upper torque values are mathematically processed 519 for display 520 as input values on the interface 406. The processor receives actual speed and torque values 521 from the DMOC motor controller 240A and mathematically processes them 522 and displays them as actual values 522, 523.

Figure 5B:
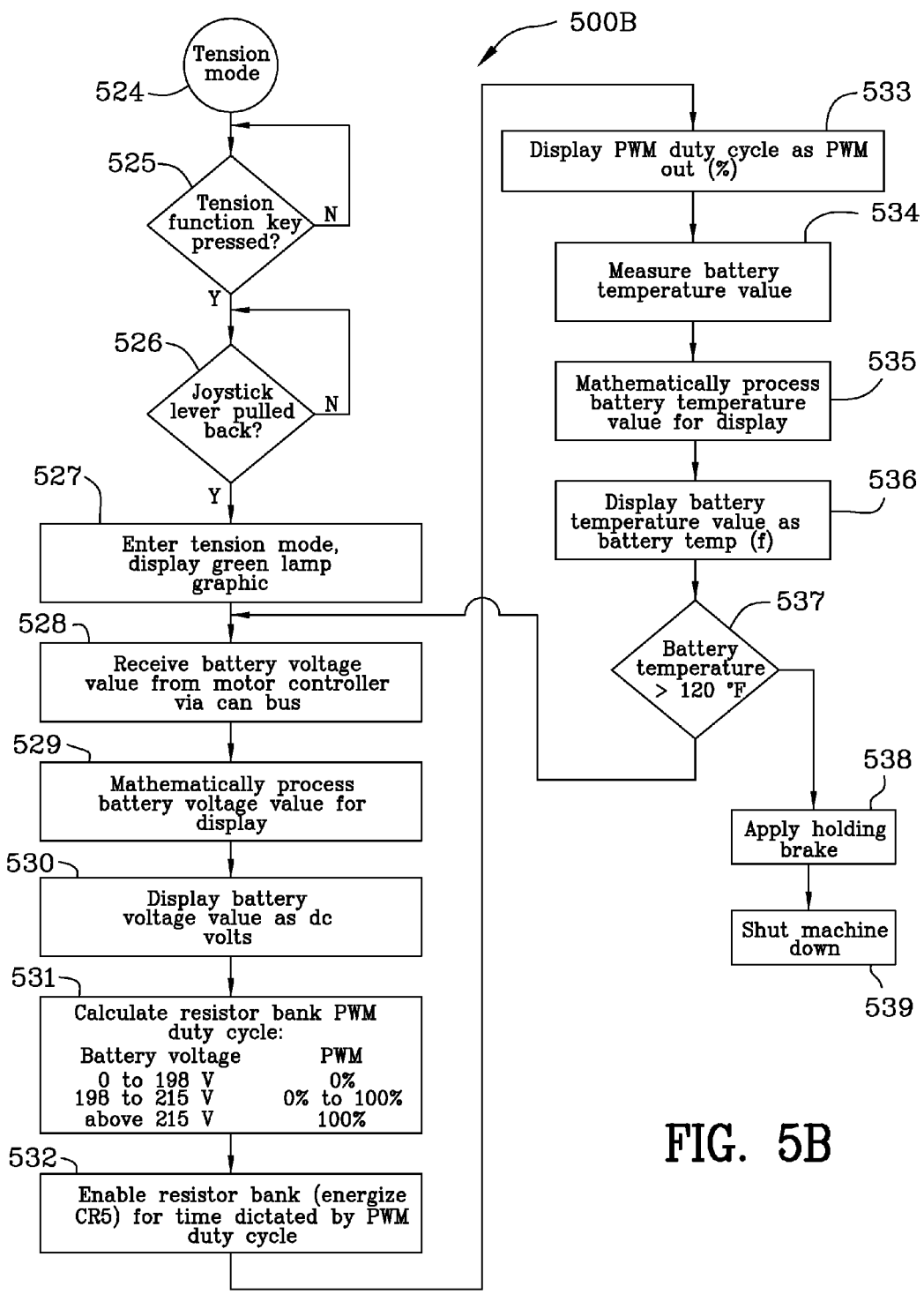
FIG. 5B is a schematic diagram of the energy control in the tension mode.

FIG. 5B is a schematic diagram 500B of the energy control and management system in the tension mode 524 resulting from depressing the tension function key 525. In the tension mode the joystick lever must be pushed back to plus or minus 10% and the tension mode green lamp is displayed 527. Battery temperature from the controller is received by the processor via the CAN bus 528 and is mathematically processed 529 for display in engineering units of volts dc 530. The resistor bank pulse width modulation duty cycle is calculated 531 depending on the voltage. The resistor bank is enable by the pulse width duty cycle as dictated by CR 5 532. The pulse width modulation duty cycle as a percentage is displayed 533 on the graphical interface. Battery temperature is measured 534 and mathematically processed 535 and displayed 536 in engineering units. If the battery temperature is greater than 120° F. then the holding brake is applied 538 and the machine is shut down 539. If the temperature is less than 120° F. then the temperature is processed for display in engineering units 528, 529 and the steps are repeated.

The input for speed is an analog signal originating from a bi-directional, single-axis joystick on the control panel. The signal that it sends is a voltage ranging from 500-4500 mV when the joystick is in its full back or full forward position, respectively. This voltage signal is received by the Parker IQAN MD3 control module/processor 306 and is represented by the voltage-in channel (pin 333) labeled Joystick. In this channel the voltage signal is converted to a percentage that ranges from −100 to 100. This value is converted into CAN program parameters. First, a dead zone is created by specifying that between −10% and +10% the value will be zero. Second, the range is converted to the CAN parameters needed by the Azure Dynamics, Inc. motor controller 240A. This CAN parameter value is 670 for max speed.

The inputs for torque are the two buttons 407A, 407B on the top of the joystick 311A. Each button inputs to channel (pins 331, 332) on processor 306. The right button 407B is connected to pin 332 to raise torque and the left button is connected to pin 331 to lower torque. An event-counter counts the amount of times the user presses the joystick buttons, adding when the right button 407B is pressed and subtracting when the left button 407A is pressed. The user reaches maximum torque after 100 clicks of the right button. The value for maximum torque in CAN parametric form is 1146.88. To reach this value in 100 clicks, each count of the Joystick is multiplied by 11.4688. This value is sent to the parameter-out channel and is the upper torque limit. The parameter-out channel, lower torque limit is either zero, as is the case when pulling, or is equal to the upper torque limit, as is the case when tensioning.

Three parameter-out channels, speed control, upper torque limit, and lower torque limit, are attached to the generic frame out channel, control message. The control message is sent to the Azure Dynamics Inc. motor controller 240A where it interprets the inputs and regulates the motor speed and torque accordingly. The motor controller 240A communicates status messages back to the processor 306 for processing and display on display 406.

The algorithms implemented by the processor described herein are set forth by way of example only. It is specifically contemplated that different algorithms may be used for the control of, for example, the electric motor(s), tension, speed, torque and safety and other parameters without departing from the spirit and scope of the claimed invention.

REFERENCE NUMERALS

A, B, C—motor phases
F1—puller function key
F2—tension function key
F3—diagnostic function key
CR1—actuator relay and relay contacts
CR2—180 Vdc relay and relay contacts
CR3—180 Vdc relay and relay contacts
CR5—resistor bank relay and relay contacts
100—prior art schematic of conductor stringing process
101—pole
102—insulator
103—stringer attachment
104—puller
105—tensioner
200—side view of puller-tensioner
200A—cross-sectional view taken along the lines 2A-2A of FIG. 2
200B—top view of puller-tensioner
200C—cross-sectional view taken along the lines 2C-2C of FIG. 2
200D—rear view of the puller-tensioner
200E—sectional view taken along the lines of 2E-2E of FIG. 2B.
200E—sectional view taken along the lines of 2F-2F of FIG. 2B.
200G—perspective view of battery and terminals
200H—enlargement of a portion of FIG. 2G
201—resistor bank cabinet
202—battery skirt
203—chain guard
204—reel shaft
205—reel
206—frame (frontal portion)
207—main frame
208—wheel covering/wheel guard
210—channel forming battery supports
211—control panel
211A—control box housing
211B—battery hatch
212—joystick
213—protective screen
220—battery
220A—upwardly extending portion of channel
220B—battery upper plate for tie down
230—conductor
231, 231A, 231B, 231C—flooring/battery cover
240—three phase electric motor
240A—DMOC motor controller
241—adapter
242—multi-disc brake
243—gearbox
252—tie down rod which may be partially threaded
256—nut which threads onto the tie down rod
254—lower plate affixed to and traverses channels
258—side wall of battery enclosure
261, 262—battery terminals 261, 262.
263—female threads within terminal 262
264—thermocouple 264 affixed into engagement with the terminal 262
300—180 volt ladder diagram
300A—12 volt ladder diagram
300B—joystick, temperature and voltage transducer
300C—pulse width modulation schematic
301—battery meter
301A—prescaler
302—keyed switch
305—charger
306—processor, Parker Hannifin, IQAN MD3-C1
306A—IQAN module
306B—IQAN Expansion Module
307—voltage transducer
307A—temperature transducer
308—180 volt battery
309—isolating converter for battery monitor
310, 310A—level wind actuator motors
311—torque rocker switch inputting to IQAN MD3-C2
311A—joystick
312—negative (−) 24 volts dc
313—positive (+) 24 volt dc supply to voltage transducer
314—thermocouple attached to first negative battery terminal
315—thermocouple attached to second negative battery terminal
315A—thermocouple
316—resistor bank
317—180 volt dc–12 volt dc+converter
318—output terminal of temperature transducer
318A—output (volts dc) to processor representing battery temperature
319—12 volt battery
320—battery interconnection with motor circuit, resistor bank and meter
321—voltage converter 12/24 volt dc
323—positive (+) 180 volt dc supply
323A—negative (−) 180 volt dc supply
324—positive (+) 24 volts dc
325—socket relay 326—output (volts dc) to processor representing voltage temperature
329—negative (−) 24 volt dc supply to voltage transducer
330—battery temperature input terminal
331—lower torque pushbutton terminal
332—raise torque pushbutton terminal
333—ground
334—common
335—source voltage joystick (positive 12 volt dc)
336—USB
337—USB
338—180 volt dc bus voltage measurement/input
338A—voltage transducer
339, 339A—communication between IQAN MD3-C1 and IQAN MD3-C2
340—positive (+) 12 volt dc
341—address tag
342—address tag
343—RS 232 communication terminal
344—RS 232 communication terminal
345—negative (−) 12 volt dc supply
346—digital output enabling CR5
347—digital output enabling brake
348—digital output enabling 180 volt dc power to motor/DMOC
349—Switch, i.e., Relay, IGBT (Insulated Gate Bipolar Transistor), or other solid state device
349C—pulse width modulation signal
349D—resistor power dissipation in % and Watts
349E—measured battery voltage, volt dc
349G—198 volts dc
350—negative (−) input terminal
351—shunt
352—positive (+) 12 volt dc voltage input to IQAN MD3-C1 processor
353—socket relay terminal on IQAN MD3-C1
354—negative (−) 12 volt dc voltage input to IQAN MD3-C1
355—communication terminal to DMOC motor controller
356—communication terminal to DMOC motor controller
357—communication terminal to IQAN XA2
358—communication terminal to IQAN XA2
359—communication terminal to IQAN MDC3-C1
360—communication terminal to IQAN MDC3-C1
361—negative (−) 12 volt dc terminal to battery meter and prescaler
362—shunt terminal connection
363—shunt terminal connection
364—prescaler connection
365—positive (+) 12 volt dc terminal to battery meter and prescaler
366—CAN communication
367—CAN communication
368—ground
369—positive (+) 12 volt dc terminal
370, 371—voltage transducer power supply
374, 375—12 volt dc output of converter
378, 379—CAN communication
382, 383—12 volt dc supply to battery monitor
391—battery
391A—ultra-capacitor
400—control panel
402—key/switch
403—level wind control
404—brake pressure indicator
405—brake control
406—master control interface
407A—torque control decrease
407B—torque control increase
420—directional indication
430—puller mode push button, F1
431—tension mode push button, F2
432—diagnostic push button, F3
500—180 volt dc control schematic flow chart
500A—motor control schematic flow chart
500B—tension mode schematic flow chart
501—master start
502—joystick lever centered?
503—holding brake off?
504—enable 180 volt dc circuit, energize CR6, CR2 and CR3
505—motor control
506—puller/tensioner automatically shutdown
507—input speed=0 if machine was automatically shutdown
508—input speed and direction (pay-out or pull-in) joystick controlled
509—upper torque set by depressing right button (increase) or left button (decrease)
510—tension mode?
511—torque reset button pressed?
512—display confirmation message of torque reset?
513—user confirmation of torque reset?
514—reset upper torque to zero
515—lower torque equals zero
516—lower torque equals upper torque in tension mode
517—conversion of speed and upper and lower torque to motor controller
518—transmit converted values to DMOC motor controller using CAN Bus
519—mathematically process input and upper torque values for display
520—display input speed and torque values
521—receive actual speed and torque values from DMOC motor controller using CAN Bus
522—mathematically process actual speed and torque values for display
523—display actual speed and torque values
524—tension mode
525—tension function key F2 pressed?
526—joystick lever pulled back?
527—enter tension mode, display green lamp
528—receive battery voltage from DMOC motor controller via CAN Bus
529—mathematically process battery voltage for display
530—display batter voltage
531—calculate resistor bank PWM duty cycle
532—enable resistor bank, energize CR5
533—display PWM duty cycle as a %
534—measure batter temperature
535—mathematically process battery temperature for display
536—display battery temperature
537—is battery temperature greater than 120 degrees Fahrenheit?
538—apply holding brake
539—shut machine down Those skilled in the art will recognize that the invention has been set forth by way of examples. As such, changes may be made to the invention has described and disclosed herein without departing from the spirit and the scope of the invention as claimed hereinbelow.

The invention claimed is:

1. A process for stringing a conductor, comprising the steps of:
   alternating between pulling and tensioning modes;
   controlling an electric motor using a processor and motor controller;
   consuming electrical energy from a plurality of batteries in said electric motor when pulling a conductor; and,
   generating electrical energy with said electric motor and charging said plurality of batteries when tensioning a conductor.

2. A process for stringing a conductor as claimed in claim 1, further comprising the steps of:
   limiting electric motor torque and speed based on operator commands for speed and torque in said pulling mode; and,
   controlling electric motor torque in said tensioning mode.

3. A process for stringing a conductor as claimed in claim 2, further comprising the steps of:
   dissipating excess electrical energy in a resistor bank.

4. A process for stringing a conductor as claimed in claim 3, further comprising the steps of:
   measuring battery voltage;
   processing said battery voltage; and,
   controlling said dissipation of excess electrical energy in said resistor bank depending on said battery voltage.

5. A process for stringing a conductor as claimed in claim 4 wherein said step of controlling said dissipation of excess electrical energy in said resistor bank includes modulating the pulse width of a control signal to a switching device in series with said resistor bank.

6. A process for stringing a conductor as claimed in claim 5 wherein said switching device is an insulated gate bipolar transistor.

7. A process for stringing a conductor as claimed in claim 6 wherein application of said pulse width begins at 198 volts dc.

8. A process for stringing a conductor as claimed in claim 5 wherein application of said pulse width begins at 198 volts dc.

9. A process for stringing a conductor as claimed in claim 8 wherein said temperature limit is 120° Fahrenheit.

10. A process for stringing a conductor as claimed in claim 3, further comprising the steps of:
    calculating total power from tension in the conductor or rope;
    measuring battery voltage and multiplying it by the battery current determining power supplied to the batteries;
    subtracting power supplied to the batteries from said total power and determining power to be dissipated in said batteries and dividing said power to be dissipated by the potential resistive power of approximately 20 kW and multiplying by 100 to arrive at the percentage of pulse width modulation to be applied.

11. A process for stringing a conductor as claimed in claim 1 further comprising the steps of:
    monitoring battery temperature; and,
    discontinuing stringing of said conductor when said battery temperature exceeds a temperature limit.

12. A process for stringing a conductor as claimed in claim 11 wherein said battery temperature is sensed from a thermocouple engaged with the first negative battery post.

13. A process for stringing a conductor as claimed in claim 1, further comprising the steps of:
    generating electrical energy with said electric motor and charging an ultra-capacitor when tensioning a conductor.

* * * * *